(12) United States Patent
Huerta Ortiz et al.

(10) Patent No.: US 10,041,384 B2
(45) Date of Patent: Aug. 7, 2018

(54) CONTROL VALVE

(71) Applicant: GM GLOBAL TECHNOLOGY OPERATIONS LLC, Detroit, MI (US)

(72) Inventors: Rolando Huerta Ortiz, Wyoming, MI (US); Michael E. McCarroll, Kentwood, MI (US)

(73) Assignee: GM Global Technology Operations, Detroit, MI (US)

( * ) Notice: Subject to any disclaimer, the term of this patent is extended or adjusted under 35 U.S.C. 154(b) by 91 days.

(21) Appl. No.: 15/168,589

(22) Filed: May 31, 2016

(65) Prior Publication Data

US 2017/0342870 A1   Nov. 30, 2017

(51) Int. Cl.
| | |
|---|---|
| *F01L 1/34* | (2006.01) |
| *F01L 1/344* | (2006.01) |
| *F16K 11/07* | (2006.01) |
| *F16K 15/04* | (2006.01) |
| *F16K 31/06* | (2006.01) |
| *F01L 9/04* | (2006.01) |
| *F01L 5/04* | (2006.01) |

(52) U.S. Cl.
CPC ........ *F01L 1/3442* (2013.01); *F16K 11/0716* (2013.01); *F16K 15/044* (2013.01); *F16K 31/0613* (2013.01); *F01L 1/344* (2013.01); *F01L 5/04* (2013.01); *F01L 9/04* (2013.01); *F01L 2001/3443* (2013.01); *F01L 2001/3444* (2013.01); *F01L 2001/34426* (2013.01); *F01L 2001/34433* (2013.01); *F01L 2001/34483* (2013.01); *F01L 2101/00* (2013.01); *F01L 2250/02* (2013.01); *F01L 2250/04* (2013.01)

(58) Field of Classification Search
CPC ..... F01L 1/344; F01L 5/04; F01L 9/04; F01L 1/3442; F01L 2009/0478; F01L 2001/3443; F01L 2001/34433; F01L 2001/34426; F16K 11/10; F16K 31/0613; F16K 11/0716; F16K 15/044; Y10T 137/87169; Y10T 137/87241
See application file for complete search history.

(56) References Cited

U.S. PATENT DOCUMENTS

| | | | |
|---|---|---|---|
| 3,580,286 A * | 5/1971 | Bash ...................... | F15B 13/04 137/625.68 |
| 8,662,039 B2 * | 3/2014 | Fischer ................. | F01L 1/3442 123/90.13 |

(Continued)

FOREIGN PATENT DOCUMENTS

JP   WO 2016068178 A1 *  5/2016   .............. F01L 1/356

*Primary Examiner* — Matthew W Jellett
*Assistant Examiner* — Christopher Ballman
(74) *Attorney, Agent, or Firm* — Quinn IP Law

(57) ABSTRACT

A control valve includes a valve housing extending along a longitudinal axis. The valve housing defines an inlet port, a first outlet port, and a second outlet port. In addition, the control valve includes a spool guide disposed inside the valve housing and a flow guide belt disposed around the spool guide. The flow guide belt is disposed inside the valve housing. The control valve further includes a spool movably disposed in the spool guide. The spool can move relative to the valve housing along the longitudinal axis between a first spool position and a second spool position. The first outlet port is in fluid communication with the inlet port when spool is disposed in the first spool position.

19 Claims, 12 Drawing Sheets

(56) References Cited

U.S. PATENT DOCUMENTS

| | | | |
|---|---|---|---|
| 9,121,311 B2 | 9/2015 | Huerta et al. | |
| 2009/0159024 A1* | 6/2009 | Paul | F01L 1/34409 123/90.15 |
| 2015/0014569 A1* | 1/2015 | Rankin | C23C 14/0605 251/366 |
| 2015/0059670 A1* | 3/2015 | Kawai | F01L 1/3442 123/90.15 |
| 2015/0059899 A1* | 3/2015 | Mukaide | F16K 31/0613 137/625.65 |
| 2015/0075460 A1* | 3/2015 | Mitsutani | F01L 1/3442 123/90.15 |
| 2015/0192043 A1* | 7/2015 | Methley | F01L 1/047 74/567 |
| 2016/0061064 A1* | 3/2016 | Mukaide | F01L 1/3442 123/90.12 |
| 2016/0123461 A1* | 5/2016 | Eber | F16H 61/0276 74/473.11 |
| 2016/0319812 A1* | 11/2016 | Krech | F04B 49/22 |
| 2016/0376945 A1* | 12/2016 | Oh | F01L 1/34409 123/90.17 |
| 2017/0022854 A1* | 1/2017 | Takada | F01L 1/3442 |
| 2017/0058727 A1* | 3/2017 | Smith | F01L 1/34409 |
| 2017/0234174 A1* | 8/2017 | Yamakawa | F01L 1/3442 123/90.17 |
| 2017/0241302 A1* | 8/2017 | Haltiner, Jr. | F01L 1/3442 |
| 2017/0268388 A1* | 9/2017 | Asahi | F01L 1/3442 |

\* cited by examiner

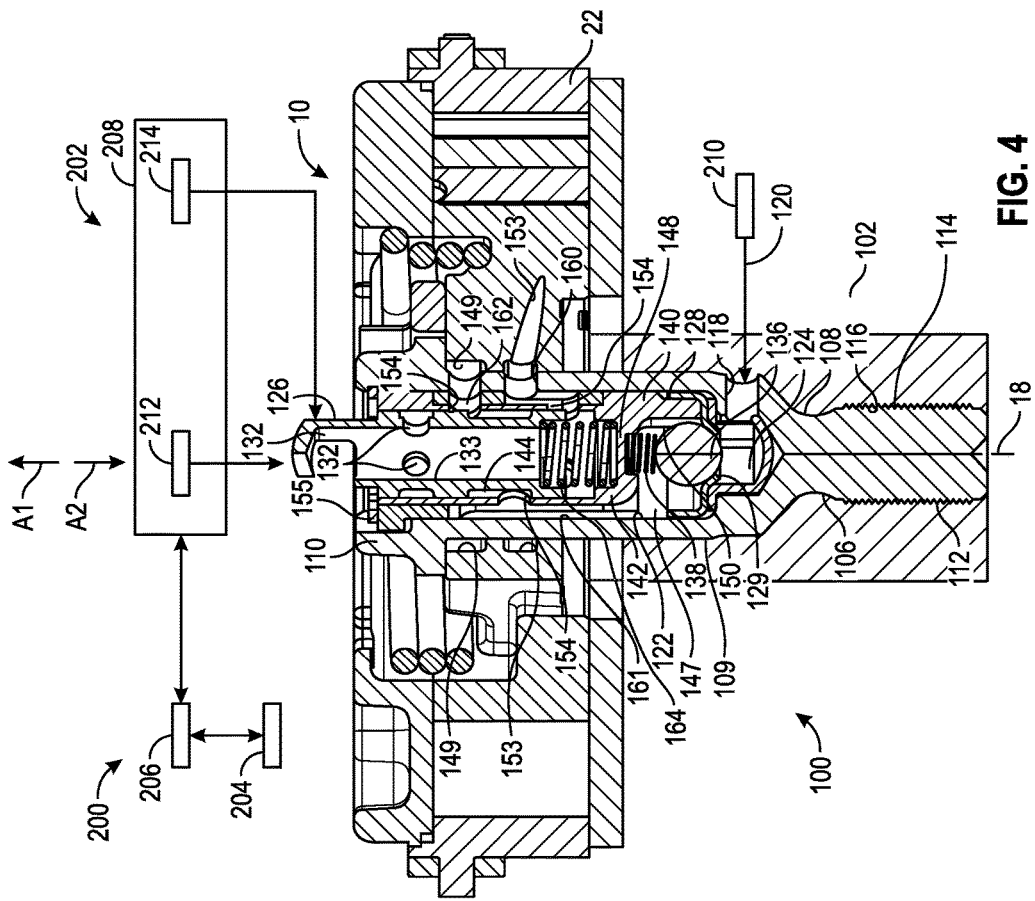
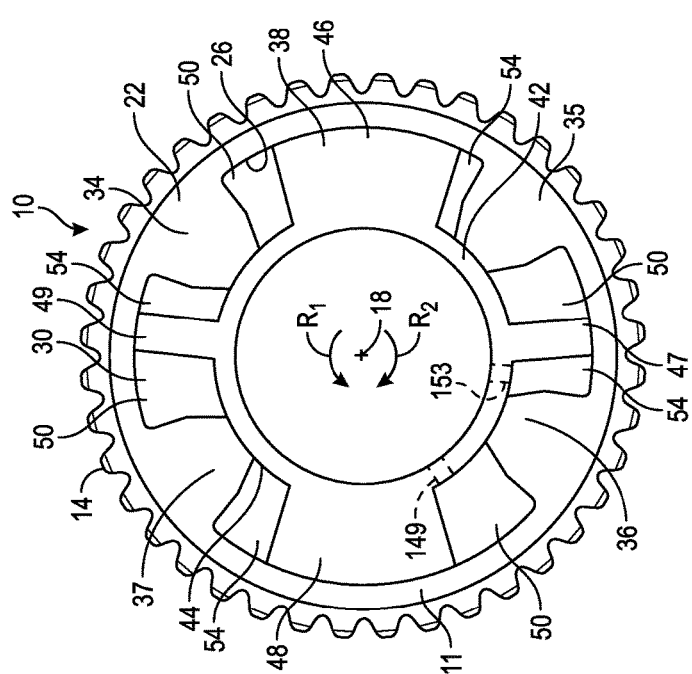
FIG. 4
FIG. 3

CONTROL VALVE

TECHNICAL FIELD

The present disclosure relates to a control valve for controlling a variable cam phaser.

BACKGROUND

Control valves can be used to control many types of devices. For example, in a vehicle, a control valve can be used to control a variable cam phaser. A variable cam phaser is operatively coupled to a camshaft. The camshaft can actuate the intake and exhaust valves of an engine. During operation of the engine, the control valve can control the variable cam phaser. The variable cam phaser can in turn control the rotation of the camshaft, relative to the crankshaft, to adjust the timing of intake and/or exhaust valve events. Adjusting valve timing based on engine operating conditions may enhance engine performance and minimize engine emissions.

SUMMARY

It is useful to control the operation of a variable cam phaser using a control valve in order to adjust the timing of intake or exhaust valve events in an engine. Variable cam phasers include a stator and a rotor disposed within the stator. The rotor can rotate relative to the stator and is operatively coupled to a camshaft. It is useful to control the movement of the rotor relative to the stator in order to control the movement of the camshaft.

The present disclosure describes a control valve that requires simpler machining operations on a valve housing and a spool guide in comparison with conventional valves, and easier dimensional management, relative to conventional valves, while still providing the precision required to modulate/control flow. Due to the structural characteristics of the presently disclosed control valve, the flow forces and mass of the fluid flowing through the valve are also reduced and the flow rate increased relative to other valves. In the presently disclosed control valve, the fluid (e.g., oil) circulates through conduits formed by three components, namely: a valve housing, a spool guide, and a flow guide belt. Accordingly, the valve housing, the spool guide, and the flow guide belt form all the fluid conduits necessary to direct flow from a fluid source to a rotor of a cam phaser. The flow guide belt may be made of a polymeric material and may snap onto the spool guide. When the flow guide belt is assembled into the valve housing, it forms the supply channels for fluid flow. The flow guide belt also provides a seal between the valve housing and the spool guide to prevent fluid flow between the valve housing and the spool guide when desired. In this control valve, the valve housing extends along a longitudinal axis and defines an inlet port, a first outlet port, and a second outlet port. The spool guide and the flow guide belt are disposed inside the valve housing. The control valve further includes a spool movably disposed in the spool guide. The spool can move relative to the valve housing along the longitudinal axis between a first spool position and a second spool position. The first outlet port is in fluid communication with the inlet port when spool is disposed in the first spool position. The spool precludes fluid flow from the inlet port to the second outlet port when the spool is disposed in the first spool position. The second outlet port is in fluid communication with the inlet port when the spool is in the second spool position. The spool precludes fluid flow from the inlet port to the first outlet port when the spool is in the second spool position.

In another embodiment, the control valve manages fluid flow within one major component (i.e., the valve housing), and reduces the proliferation of several components to form the flow conduits. In this embodiment, the valve housing includes all the fluid conduits necessary to control the flow from inlet ports to the rotor control ports without the need to use orifices in the cam nose to direct fluid flow to the cam phaser. The valve housing extends along a longitudinal axis and includes a housing body. Further, the valve housing defines an inner housing cavity, an inlet port, a first outlet port in communication with the inner housing cavity, a second outlet port in communication with the inner housing cavity, and a plurality of supply passageways extending through housing body. Each of the supply passageways fluidly couples the inlet port with the inner housing cavity. Each of the supply passageways in is fluid communication with the inlet port. The control valve further includes a spool movably disposed in the valve housing. The spool can move relative to the valve housing along the longitudinal axis between a first spool position and a second spool position. The first outlet port is in fluid communication with the inlet port when spool is disposed in the first spool position. The spool precludes fluid flow from the inlet port to the second outlet port when the spool is disposed in the first spool position. The second outlet port is in fluid communication with the inlet port when the spool is in the second spool position. The spool precludes fluid flow from the inlet port to the first outlet port when the spool is in the second spool position.

In another embodiment, the control valve contains the flow circuit within itself, and provide more flexibility for packaging as well as higher flow rate relative to conventional valves. In this embodiment, the valve housing includes open channels that form the supply passageway with a flow delivery enclosure (e.g., sleeve) that is press-fitted to the housing. The flow delivery enclosure seals and isolates the supply passages from each other. The valve housing extends along a longitudinal axis and includes a housing body. Further, the valve housing defines an inner housing cavity, an inlet port, a first outlet port in communication with the inner housing cavity, and a second outlet port in communication with the inner housing cavity. The flow delivery enclosure is disposed around the valve housing. The flow delivery enclosure and the valve housing collectively define a plurality of supply channels between the flow delivery enclosure and the valve housing. Each of the supply channels fluidly couples the inlet port and the inner housing cavity. The control valve also includes a spool movably disposed inside the inner housing cavity. The spool is movable relative to the valve housing along the longitudinal axis between a first spool position and a second spool position. The first outlet port is in fluid communication with the inlet port when spool is disposed in the first spool position. The spool precludes fluid flow from the inlet port to the second outlet port when the spool is disposed in the first spool position. The second outlet port is in fluid communication with the inlet port when the spool is in the second spool position. The spool precludes fluid flow from the inlet port to the first outlet port when the spool is in the second spool position.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 3 is a schematic, top view of the variable cam phaser assembly shown in FIG. 1.

FIG. 4 is a schematic, cross-sectional view of the variable cam phaser assembly shown in FIG. 2, showing a check ball in a first ball position.

DETAILED DESCRIPTION

Figure 2:
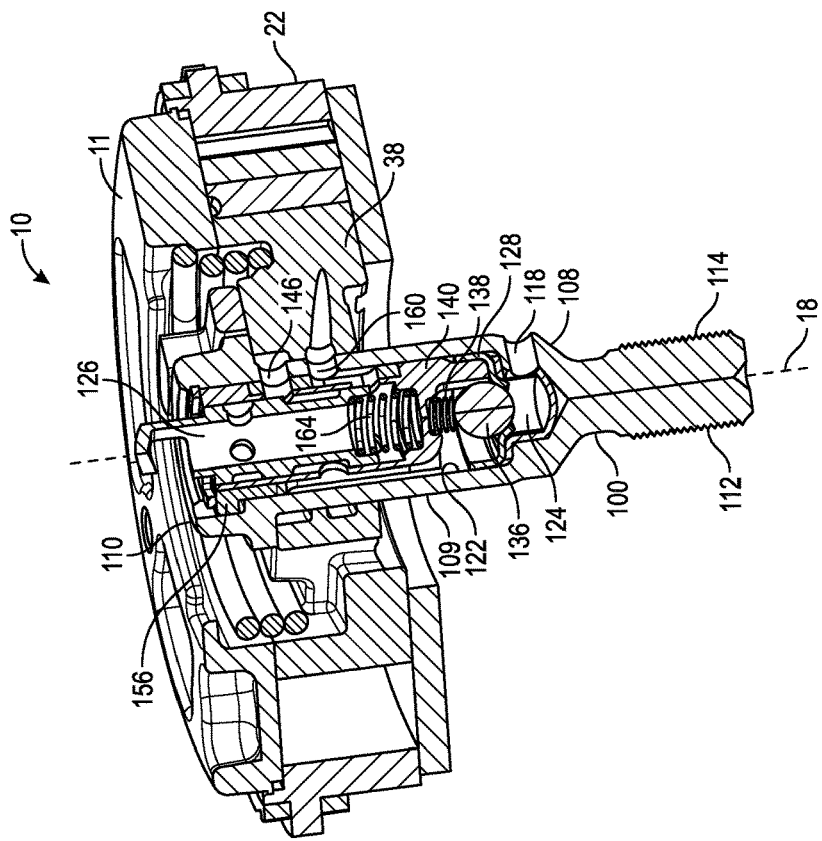
FIG. 2 is a schematic, perspective cross-sectional view of the variable cam phaser assembly shown in FIG. 1, taken along section line 2-2.
Figure 1:
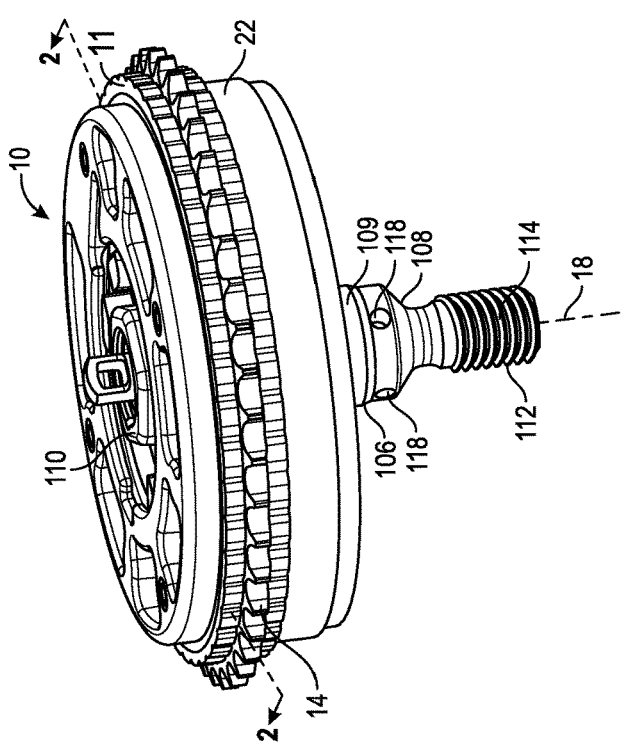
FIG. 1 is a schematic, perspective view of a variable cam phaser assembly including a cam phaser and a control valve coupled to the cam phaser.
Figure 5A:
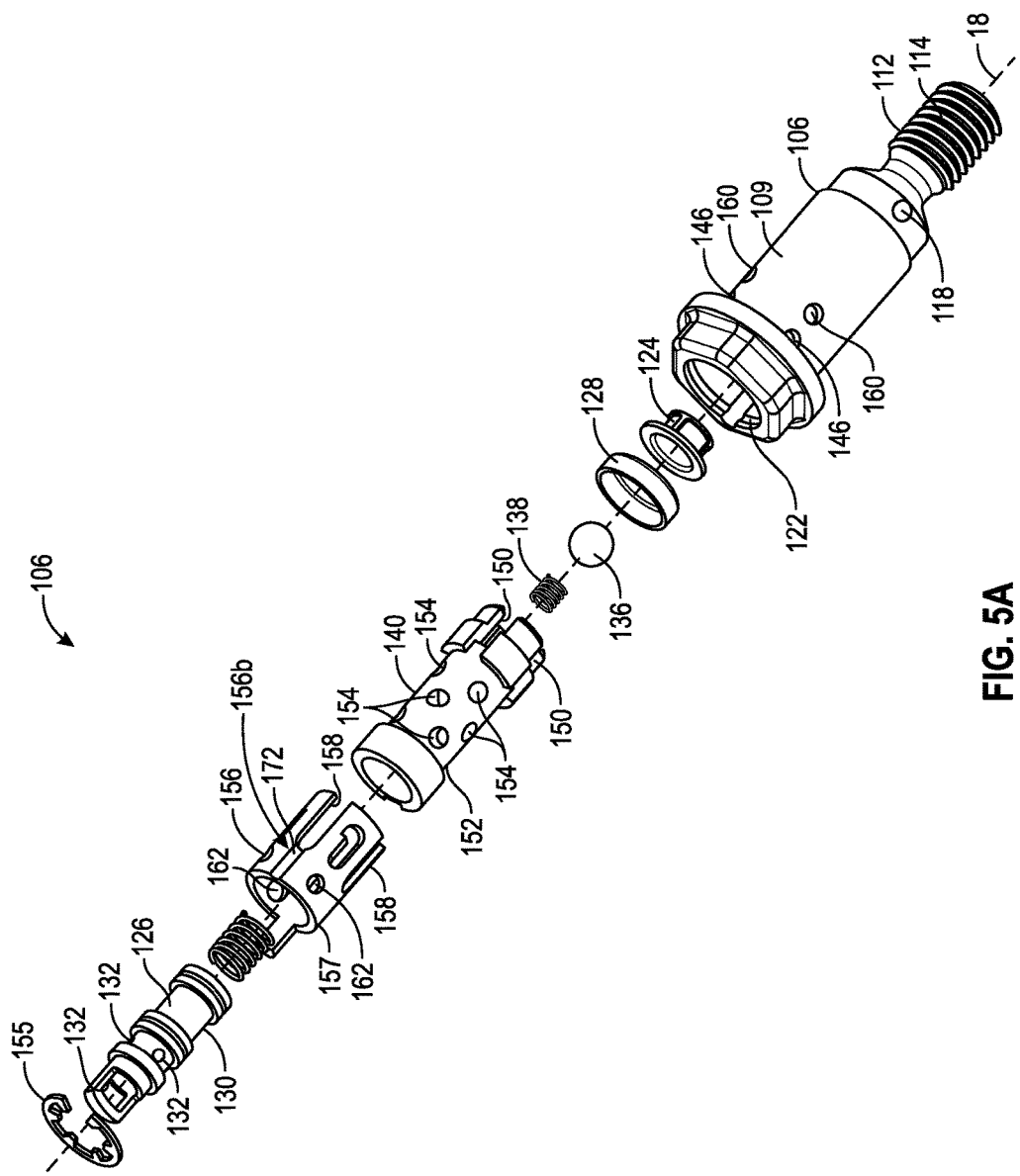
FIG. 5A is a schematic, perspective, exploded view of the control valve shown of the variable cam phaser assembly shown in FIG. 1.
Figure 5B:
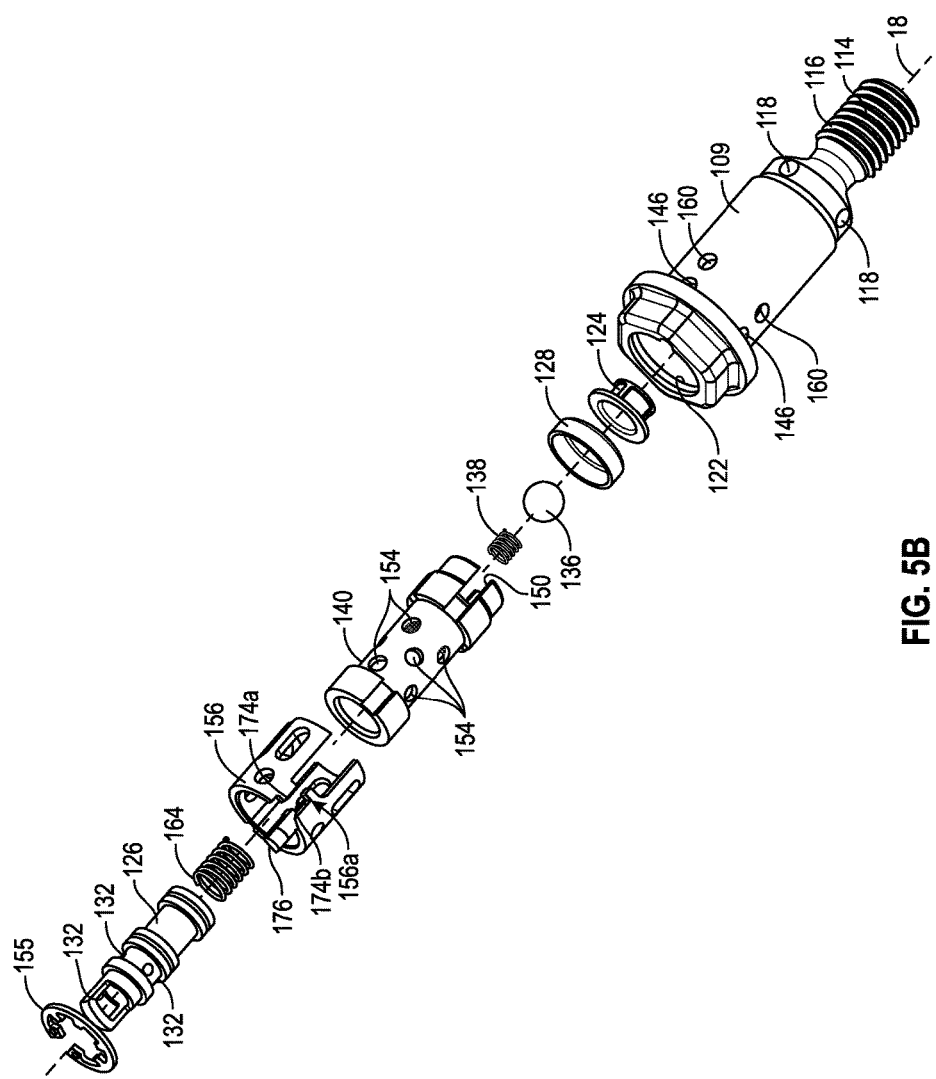
FIG. 5B is another schematic, perspective, exploded view of the control valve shown of the variable cam phaser assembly shown in FIG. 1.

Referring now to the drawings, wherein like numerals indicate corresponding parts throughout the several views, FIGS. 1-4 schematically illustrate a variable cam phaser assembly 10 for adjusting the timing of the intake and exhaust events in an internal combustion engine. The variable cam phaser assembly 10 includes a variable cam phaser 11 and a control valve 106 coupled to the variable cam phaser 11. The variable cam phaser 11 includes a stator 22 and a rotor 38. The rotor 38 can rotate relative to the stator 22 about a longitudinal axis 18.

The variable cam phaser assembly 10 is part of a camshaft system 100 (FIG. 4). The camshaft system 100 includes a camshaft 102 (FIG. 4) and is operatively coupled to the rotor 38. The camshaft 102 can rotate about the longitudinal axis 18. The control valve 106 includes a valve housing 108 extending along the longitudinal axis 18. The valve housing 108 serves as a coupler and couples the rotor 38 to the camshaft 102. As a non-limiting example, the valve housing 108 may be configured as a bolt having a head 110 and a shank 112 coupled to the head 110. The head 110 and the shank 112 is at least partly disposed in the rotor 38. The shank 112 extends through the camshaft 102. The shank 112 may include external threads 114, and the camshaft 102 includes inner threads 116 configured to mate with the external threads 114 in order to couple the valve housing 108 to the camshaft 102.

With specific reference to FIG. 3, the variable cam phaser 11 includes a sprocket 14 for engaging a belt or chain. The sprocket 14 is connected to an engine crankshaft. Accordingly, the sprocket 14 is drivable by the engine crankshaft via the chain for rotation about the longitudinal axis 18. As discussed above, the variable cam phaser 11 also includes the stator 22. The stator 22 is mounted with respect to the sprocket 14 for unitary rotation therewith about the longitudinal axis 18. The stator 22 has an inner surface 26 that defines a stator inner cavity 30. The inner surface 26 is generally cylindrical, but includes a plurality of lobes 34, 35, 36, 37 that extend radially inward (toward the longitudinal axis 18).

As discussed above, the variable cam phaser 11 also includes the rotor 38. The rotor 38 is disposed within the stator inner cavity 30 and includes a hub portion 42 having a generally cylindrical outer surface 44. A plurality of vanes 46, 47, 48, 49 extend outward from the hub portion 42. It is envisioned that the vanes 46, 47, 48, 49 may have different shapes or the same shapes. Irrespective of their shape, each vane 46, 47, 48, 49 contacts a respective cylindrical portion of the inner surface 26 of the stator 22. Each of the vanes 46, 47, 48, 49 is disposed between two of the lobes 34, 35, 36, 37. Each lobe 34, 35, 36, 37 contacts a cylindrical portion of the outer surface 44 of the rotor 38. The lobes 34, 35, 36, 37 and the vanes 46, 47, 48, 49 define chambers 50, 54 therebetween. The chambers 50, 54 are selectively pressurized by hydraulic fluid to cause the rotor 38 to rotate about the longitudinal axis 18 with respect to the stator 22 and thereby change the valve timing in the engine 204 (FIG. 4). The chamber 50 may be referred to as the first chamber, and the chamber 54 may be referred to as the second chamber.

More specifically, the rotor 38 is mounted with respect to the camshaft 102 (FIG. 4). Accordingly, rotating the rotor 38 relative to the stator 22 in one direction (i.e., the first rotational direction R1 or second rotational direction R2) will advance valve timing, whereas rotating the rotor 38 relative to the stator 22 in the opposite direction will retard timing. The movement of the rotor 38 relative to the stator 22 is limited by interference between the lobes 34, 35, 36, 37 and the vanes 46, 47, 48, 49. For example, maximum valve timing advance may occur when vane 49 contacts lobe 34, and maximum valve timing retard may occur when vane 49 contacts lobe 37.

With reference to FIGS. 1-5B, the camshaft system 100 may be part of an engine assembly 200. The engine assembly 200 may be part of a vehicle 202, such as a car. In the depicted embodiment, the engine assembly 200 includes an internal combustion engine 204 and an engine control module (ECM) or controller 206 in communication, such as electronic communication, with the engine 204. The terms "control module," "control," "controller," "control unit," "processor" and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean any controller executable instruction sets including calibrations and look-up tables.

The engine assembly 200 further includes an actuation assembly 208, such as a solenoid assembly. The actuation assembly 208 is in communication with the ECM 206 and, accordingly, can receive signals generated by the ECM 206. As a non-limiting example, the actuation assembly 208 may be in electronic communication with the ECM 206. As discussed in detail below, the actuator assembly 208 is operatively coupled to the control valve 106. In addition to the actuator assembly 208, the engine assembly 200 includes a fluid source 210, such as an oil source, fluidly coupled to the control valve 106. The fluid source 210 contains a fluid 120, such as oil, and can supply the fluid 120 to the control valve 106 as discussed in detail below. A pump (or any other suitable pressure source or fluid displacement device) can be used to displace the fluid 120 from the fluid source 210 to the control valve 106. It is envisioned that the fluid source 210 may be cam bearings.

The control valve 106 is also part of the engine assembly 200 and defines at least one inlet port 118 in fluid communication with the fluid source 210. In the depicted embodiment, the valve housing 108 of the control valve 106 includes a housing body 109 and defines a plurality of inlet ports 118 extending through the housing body 109. Specifically, the inlet ports 118 each extend through at least a portion of the shank 112 and traverse the longitudinal axis 18. Accordingly, the fluid source 210 can supply the fluid 120 (e.g., oil) to the control valve 106 via the inlet ports 118.

Aside from the inlet ports 118, the housing body 109 is substantially cylindrical and defines an inner housing cavity 122 extending along the longitudinal axis 18. The inner housing cavity 122 is in fluid communication with the inlet ports 118. The valve housing 108 further defines a first group of outlet ports, which are referred to as the first outlet ports 146, and a second group of outlet ports, which are referred to as the second outlet ports 160. It is contemplated that the valve housing 108 may include only one first outlet port 146 and only one second outlet port 160. Regardless of the quantity, each of the first outlet ports 146 and the second outlet ports 160 extends through the housing body 109 and is in fluid communication with the inner housing cavity 122.

The control valve 106 further includes a filter 124 for filtering the fluid 120 (e.g., oil) entering through the inlet ports 118. Accordingly, the filter 124 is disposed in the inner housing cavity 122 adjacent to the inlet ports 118. Due to the position of the filter 124 relative to the inlet ports 118, the fluid 120 can enter through the inlet ports 118 and then pass through the filter 124. As a consequence, the fluid 120 entering the control valve 106 through the inlet ports 118 is filtered before exiting the control valve 106.

The control valve 106 also includes a check ball seat 128 disposed inside the valve housing 108. Specifically, the check ball seat 128 is disposed in the inner housing cavity 122 and over the filter 124. The check ball seat 128 includes defines a seat opening 129 (FIG. 4) in fluid communication with the inlet ports 118. The control valve 106 additionally includes a check ball 136 configured, shaped, and sized to be disposed on the check ball seat 128. In particular, the check ball 136 is configured to completely block the seat opening 129, thereby precluding fluid flow through the seat opening 129. The control valve 106 also includes a check ball spring 138 coupled to the check ball 136. As such, the check ball spring 138 biases the check ball 136 toward the seat opening 129 in the direction indicated by arrow A2. Accordingly, the check ball 136, the check ball spring 138, and the check ball seat 128 jointly serve as a check valve (i.e., a one-way valve) configured to allow fluid flow from the inlet ports 118 into the inner valve housing cavity 122 through the seat opening 129 but precludes fluid flow from the inner housing cavity 122 to the inlet ports 118 through the seat opening 129.

Figure 6:
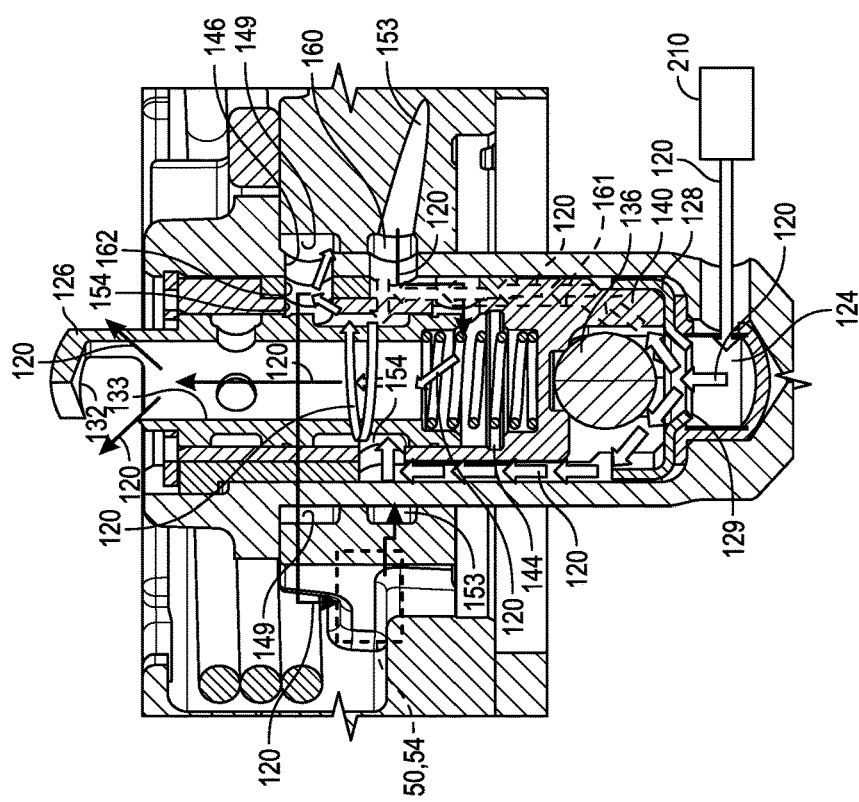
FIG. 6 is a schematic, cross-sectional view of the variable cam phaser assembly shown in FIG. 2, showing the check ball in a second ball position and a spool in a first spool position.

In operation, when the fluid 120 (e.g., oil) flows from the inlet ports 118 toward the inner housing cavity 122, the fluid 120 exerts sufficient pressure on the check ball 136 against the bias of the check ball spring 138 to cause the check ball 136 to move in the direction indicated by arrow A1 from a first ball position (FIG. 4) to a second ball position (FIG. 6). In the second ball position (FIG. 6), the check ball 136 does not block the seat opening 129, thereby allowing fluid flow from the inlet ports 118 toward the inner housing cavity 122 through the seat opening 129. When the fluid 120 does not exert pressure on the check ball 136 or when fluid 120 tries to flow from the inner housing cavity 122 toward the inlet ports 118, the check ball spring 138 biases the check ball 136 towards the direction indicated by arrow A2 until the check ball 136 reaches the first ball position (FIG. 4). In the first ball position, the check ball 136 completely blocks the seat opening 129, precluding fluid flow from the inner housing cavity 122 to the inlet ports 118 through the seat opening 129.

The control valve 106 includes a spool guide 140 partly disposed inside the check ball seat 128. The spool guide 140 is configured, shaped, and sized to fit inside the valve housing 108. As a non-limiting example, the spool guide 140 may have a substantially cylindrical shape in order to fit inside the valve housing 108, which has a substantially cylindrical shape. The spool guide 140 includes a guide body 142 and defines a first inner guide cavity 144, a second inner guide cavity 147, and a dividing wall 148 separating the first inner guide cavity 144 and the second inner guide cavity 147. The first inner guide cavity 144 and the second inner guide cavity 147 are both inside the guide body 142 but are separated by the dividing wall 148. The check ball 136 is at least partly disposed inside the second inner guide cavity 147. The check ball spring 138 is also disposed inside the second inner guide cavity 147. In the depicted embodiment, the check ball spring 138 is coupled to the dividing wall 148 and the check ball 136 in order to bias the check ball 136 toward the seat opening 129 and the inlet ports 118. The control valve 106 also includes a retainer clip 155 coupled to the spool guide 140 within the valve housing 108 to retain the spool guide 140 inside the valve housing 108. It is contemplated that the check ball seat 128 and the filter 124 may be integrally formed with each other so as to form a one-piece structure in order to reduce the number of individual components in the control valve 106.

The second inner guide cavity 147 may be referred to as the inlet-flow discharge chamber, because it is in fluid communication with the inlet ports 118 through the seat opening 129. The spool guide 140 further defines a plurality of supply orifices 150 extending through the guide body 142. The supply orifices 150 are in fluid communication with the second inner guide cavity 147 and the inner housing cavity 122. Accordingly, the fluid 120 can flow from the second inner guide cavity 147 to the inner housing cavity 122 via the supply orifices 150 extending through the guide body 142. The guide body 142 further includes a central body portion 152 and defines a plurality of guide control ports 154 extending through the central body portion 152. The guide control ports 154 are in fluid communication with the first inner guide cavity 144 and the inner valve housing 122.

In addition to the spool guide 140, the control valve 106 includes a flow guide belt 156, which may be wholly or partly made of a polymeric material, thereby allowing the flow guide belt 156 to be snapped onto the spool guide 140. The flow guide belt 156 is open at one side 156a and has a slot 172 at the opposite side 156b. The slot 172 functions as a hinge to allow the flow guide belt 156 to open for proper snapping onto the spool guide 140 and then buckled by the front dove tail features 174a, 174b located below the anti-rotating tab 176. The flow guide belt 156 is coupled to the spool guide 140, such that the flow guide belt 156 remains stationary relative to the spool guide 140. Thus, the flow guide belt 156 and the spool guide 140 are discrete components that are coupled to each other. The flow guide belt 156 includes a belt body 157 and defines a plurality of open slots 158 extending into or through the belt body 157. The flow guide belt 156 is disposed inside the valve housing 108 and surrounds the spool guide 140. As a result, the open slots 158 are covered by the valve housing 108. Therefore, the flow guide belt 156 and the valve housing 108 jointly form supply channels 161, which are partly formed by the open slots 158 of the flow guide belt 156. The supply channels 161 are in fluid communication with the second inner guide cavity 147. Accordingly, the fluid 120 can flow between the second inner guide cavity 147 and the supply channels 161. The flow guide belt 156 also includes belt control ports 162 extending through the belt body 157. Each of the belt control ports 162 is aligned with a respective guide control ports 154. Thus, the belt control ports 162 are in fluid communication with respective guide control ports 154.

The control valve 106 further includes a spool spring 164 and a spool 126 coupled to the spool spring 164. The spool spring 164 is disposed inside first inner guide cavity 144 and may be directly coupled to the dividing wall 148 of the spool guide 140. The spool spring 164 is also coupled to the spool 126 in order to bias the spool 126 in the direction indicated by arrow A1 away from the inlet ports 118.

Figure 7:
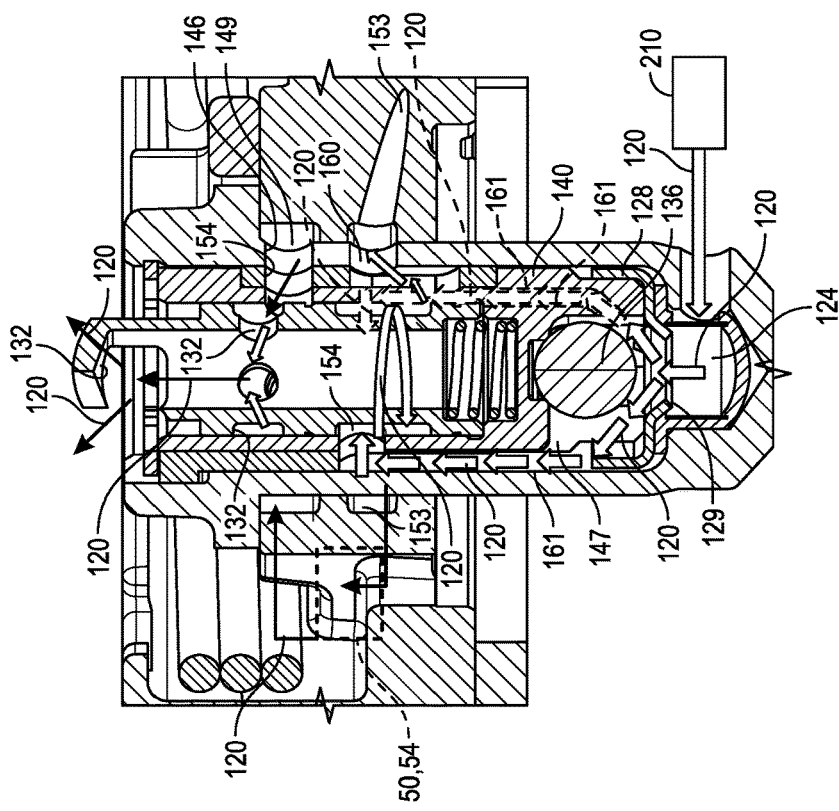
FIG. 7 is a schematic, cross-sectional view of the variable cam phaser assembly shown in FIG. 2, showing the check ball in the second ball position and the spool in a second spool position.

The spool 126 is movably disposed in the spool guide 140 and may be substantially cylindrical in order to fit within the spool guide 140. Specifically, the spool 126 is at least partly disposed in the first inner guide cavity 144. As such, the spool 126 can move within the spool guide 140 along the longitudinal axis 18 between a first spool position (FIG. 6) and a second spool position (FIG. 7). Therefore, the spool 126 can move inside the valve housing 108 in the direction indicated by arrows A1 and A2. In the depicted embodiment, the spool 126 includes a spool body 130 and defines a plurality of spool vents 132 extending through the spool body 130. The spool vents 132 allow the fluid 120 to exit the control valve 106. The spool 126 defines an inner spool cavity 133 extending through the spool body 130 along the longitudinal axis 18. The inner cavity 133 is in fluid communication with the spool vents 132 to allow fluid to exit the control valve 106. However, the dividing wall 148 precludes liquid fluid flow between the inlets ports 118 and the inner spool cavity 133, thus, preventing cross talk between inlet and control chambers.

The rotor 38 defines one or more first rotor passageways 149 and one or more second rotor passageways 153. The first rotor passageway 149 extends through the rotor 38 and can fluidly couple the first chamber 50 (FIG. 3) to the supply channels 161 or the spool vents 132 depending on the position of the spool 126 relative to the valve housing 108. When the spool 126 is in the first spool position (FIG. 6) relative to the valve housing 108, the first rotor passageway 149 fluidly couples the inlet ports 118 with the first chamber 50 via the supply passageways 161, the spool 126 precludes fluid flow between the inlet ports 118 and the second rotor passageway 153, and the second rotor passageway 153 is in fluid communication with the spool vents 132. On the other hand, when the spool 126 is in the second spool position relative to the valve housing 108 (FIG. 7), the second rotor passageway 153 is in fluid communication with the inlet ports 118 via the supply channels 161, the spool 126 precludes fluid flow between the inlet ports 118 and the first rotor passageway 149, and the first rotor passageway 149 is in fluid communication with the spool vents 132.

The flow of the fluid 120 through the first rotor passageways 149 and the second rotor passageways 153 depends, at least in part, on the movement and position of the spool 126 in relation to the valve housing 108. To move the spool 126 relative to the valve housing 108, the camshaft system 100 includes the actuation assembly 208, which is operatively coupled to the spool 126. As such, upon actuation of the actuation assembly 208, the spool 126 moves relative to the valve housing 108 along the longitudinal axis 18. As a non-limiting example, the actuation assembly 208 can modulate the movement of the spool 126 upon receipt of a modulation signal from the ECM 206. To do so, the actuation assembly 208 may include a pulse-width modulation (PWM) module 212, such as a PWM controller, operatively coupled to the spool 126. During operation, the PWM module 212 can modulate the movement of the spool 126, for example, via rapid semiconductor switching to generate a required voltage output in order to continuously adjust the position of the spool 126 based at least in part on signals or instructions (e.g., modulation signal) generated by the ECM 206. In other words, the actuation assembly 208 can modulate the movement of the spool 126 upon receipt of a modulation signal from the ECM 206. The position of the first spool 126 relative to the valve housing 108 can be adjusted to retard or advance to the rotor 38 relative to the stator 22. Therefore, the position of the spool 126 is not limited to the first and second spool positions. Rather, the spool 126 can continuously move and could be anywhere in between first and second spool positions as commanded by the ECM 206.

Alternatively or additionally, the actuation assembly 208 may include an On/Off module 214, such as an On/Off controller or circuit, operatively coupled to the spool 126. As such, the On/Off module 214 can move the spool 126 in order to move the spool 126 relative to the valve housing 108. As a non-limiting example, the On/Off module 214 can move the spool 126 from the first spool position (FIG. 6) to the second spool position (FIG. 7) upon receipt of an On signal from the ECM 206. In other words, the actuation assembly 208 can move the spool 126 from the first spool position (FIG. 6) to the second spool position (FIG. 7) upon receipt of an On signal from the ECM 206. Conversely, the On/Off module 214 can move the spool 126 from the second spool position (FIG. 7) to the first spool position (FIG. 6)

upon receipt of an Off signal from the ECM 206. In other words, the actuation assembly 208 can move the spool 126 from the second spool position (FIG. 7) to the first spool position (FIG. 6) upon receipt of an Off signal from the ECM 206. Although the drawings show that the actuation assembly 208 includes the PWM module 212 and the On/Off module 214, the PWM module 212 and the On/Off module 214 may be separate components. It is also contemplated that the PWM module 212 and the On/Off module 214 may be other suitable actuators, such as entirely mechanical actuators. Accordingly, the PWM module 212 may be alternatively referred to as a first actuation module, and the On/Off module 214 may be referred to as a second actuation module.

With reference to FIG. 6, when the spool 126 is in the first spool position, the control valve 106 is in the default position. When the control valve 106 is in the default position (i.e., the zero stroke position), the rotor 38 of the variable cam phaser 10 is in the fully retarded position in the case of an intake application, and in the fully advanced position in the case of an exhaust application. As discussed above, the spool spring 164 biases the spool 126 to the first spool position and, therefore, the rotor 38 is designed to mechanically default to its fully retarded position or advanced position depending on the application described above.

With continued reference to FIG. 6, when the spool 126 is in the first spool position, the fluid 120 can flow from the fluid source 210, such as an oil supply from a cam bearing journal, to the inlet ports 118. The fluid 120 then passes through the filter 124, where it is filtered to maximize the life of the control valve 106. After passing through the filter 124, the fluid 120 flows through the seat opening 129 of the check ball seat 128. As the fluid 120 enters the seat opening 129, the pressure exerted by the fluid 120 on the check ball 136 causes the check ball 136 to move, against the influence of the check ball spring 138, from the first ball position (FIG. 4) to the second ball position (FIG. 6), thereby allowing the fluid 120 to enter the second inner guide cavity 147 of the spool guide 140 via the check ball seat 128. At this juncture, the dividing wall 148 does not allow the fluid 120 to flow from the second inner guide cavity 147 to the first inner guide cavity 144 of the spool guide 140. Rather, the fluid 120 flows from the second inner guide cavity 147 to the supply channels 161 through the supply orifices 150 of the spool guide 140. Then, the fluid 120 flows from the supply channels 161 to the first inner guide cavity 144 of the spool guide 140 through the guide control ports 154.

With continued reference to FIG. 6, once in the first inner guide cavity 147, the fluid 120 flows around (and outside) the spool 126 until it exits the control valve 106 through the guide control ports 154 of the spool guide 140, the belt control ports 162 of the flow guide belt 156, and the first outlet ports 146 of the valve housing 108. Because of the position of the spool 126 relative to the valve housing 108, the fluid 120 can flow from the first outlet ports 146 of the valve housing 108 to the first rotor passageway 149 of the rotor 38 until the fluid 120 reaches the first chamber 50 of the rotor 38. As a consequence, the rotor 38 rotates relative to the stator 22 about the longitudinal axis 18 in the first rotational direction R1. When disposed in the first spool position, the spool 126 precludes the fluid 120 from flowing from the inlet ports 118 to the second outlet ports 160 of the valve housing 108. Instead, the fluid 120 can flow from the second chamber 54 of the rotor 38 into the inner spool cavity 133 of the spool 126 through the second outlet ports 160, the supply channels 161, and the first inner guide cavity 144 of the spool guide 140. Once the fluid 120 is in the inner spool cavity 133 of the spool 126, the fluid 120 can exit the control valve 106 through the spool vents 132.

Figure 8:
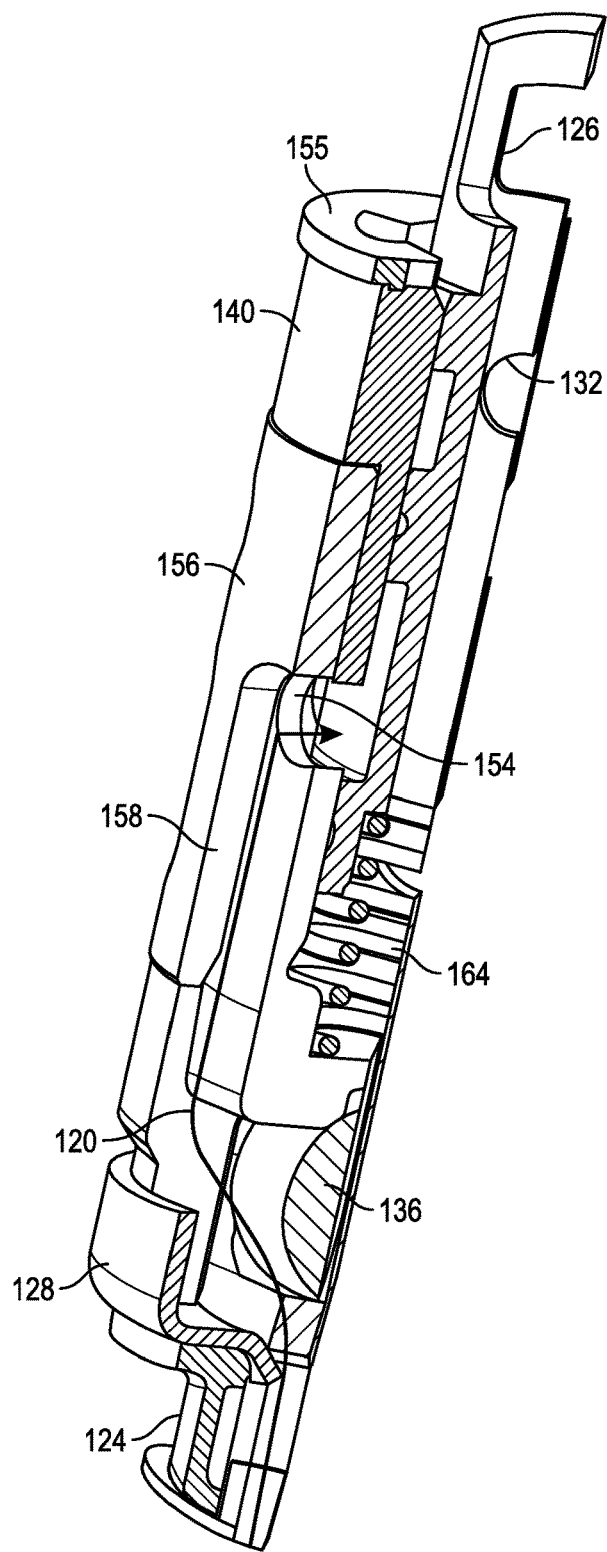
FIG. 8 is a schematic, perspective cross-sectional view of the control valve shown in FIG. 1 without the valve housing.

With reference to FIGS. 7 and 8, as discussed above, the actuation assembly 208 can move the spool 126 from the first spool position (FIG. 6) to the second spool position (FIG. 7) against the bias of the spool spring 164. When the spool 126 is in the second spool position (i.e., the full stroke position), the rotor 38 of the variable cam phaser 11 is in the fully advanced position in the case of an intake application, and in the fully retarded position in the case of an exhaust application. When the spool 126 is in the second spool position, the fluid 120 can flow from the fluid source 210, such as an oil supply from a cam bearing journal, to the inlet ports 118. The fluid 120 then passes through the filter 124, where it is filtered to maximize the life of the control valve 106. After passing through the filter 124, the fluid 120 flows through the seat opening 129 of the check ball seat 128. As the fluid 120 enters the seat opening 129, the pressure exerted by the fluid 120 on the check ball 136 causes the check ball 136 to move, against the influence of the check ball spring 138, from the first ball position (FIG. 4) to the second ball position (FIG. 6), thereby allowing the fluid 120 to enter the second inner guide cavity 147 of the spool guide 140 via the check ball seat 128. At this juncture, the dividing wall 148 does not allow the fluid 120 to flow from the second inner guide cavity 147 to the first inner guide cavity 144 of the spool guide 140. Rather, the fluid 120 flows from the second inner guide cavity 147 to the supply channels 161 through the supply orifices 150 of the spool guide 140. Then, the fluid 120 flows from the supply channels 161 to the first inner guide cavity 144 of the spool guide 140 through the guide control ports 154.

With continued reference to FIGS. 7 and 8, once in the first inner guide cavity 147, the fluid 120 flows around (and outside) the spool 126 until it exits the control valve 106 through the guide control ports 154 of the spool guide 140, the belt control ports 162 of the flow guide belt 156, and the second outlet ports 160 of the valve housing 108. Because of the position of the spool 126 relative to the valve housing 108, the fluid 120 can flow from the second outlet ports 160 of the valve housing 108 to the second rotor passageway 153 of the rotor 38 until the fluid 120 reaches the second chamber 54 of the rotor 38. As a consequence, the rotor 38 rotates relative to the stator 22 about the longitudinal axis 18 in the second rotational direction R2. When disposed in the second spool position, the spool 126 precludes the fluid 120 from flowing from the inlet ports 118 to the first outlet ports 146 of the valve housing 108. Instead, the fluid 120 can flow from the first chamber 50 of the rotor 38 into the inner spool cavity 133 of the spool 126 through the first outlet ports 146, the supply channels 161, and the first inner guide cavity 144 of the spool guide 140. Once the fluid 120 is in the inner spool cavity 133 of the spool 126, the fluid 120 can exit the control valve 106 through the spool vents 132. In this embodiment, the valve housing 108, flow guide belt 156, and the spool guide 140 cooperate to form all the fluid conduits (e.g., inlet ports 118, supply channels 161, belt control ports 162, guide control ports 154, first outlet ports 146, second outlet ports 160, supply orifices 150, open slots 158) necessary to direct fluid flow (e.g., oil flow) from the fluid source 210 to the rotor 38, thereby minimizing the flow forces and mass of the fluid flowing through the control valve 106 while maximizing the flow rate.

Figure 10:
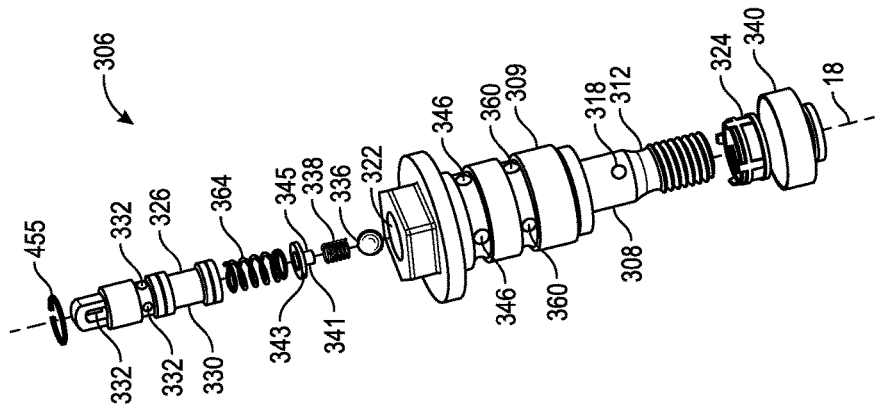
FIG. 10 is a schematic, perspective exploded view of the control valve shown in FIG. 9.
Figure 9:
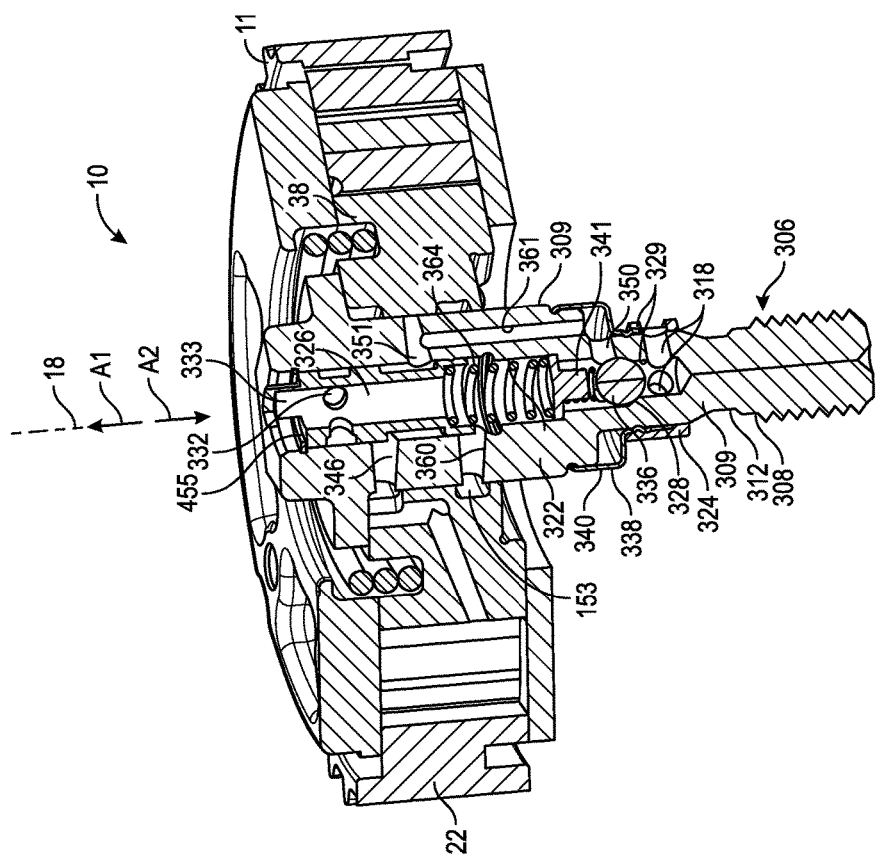
FIG. 9 is a schematic, cross-sectional view of the variable cam phaser assembly including a control valve in accordance with an alternate embodiment of the present disclosure.

With reference to FIGS. 9 and 10, the variable cam phaser assembly 10 includes an alternate embodiment of the control valve 306. The structure and operation of the control valve 306 is similar to the structure and operation of the control valve 106 described above. Therefore, the differences between the control valve 306 and the control valve 106 are highlighted below.

The control valve 306 includes a valve housing 308 extending along the longitudinal axis 18. The valve housing 308 is configured as integral component (i.e., a one-piece structure) in order to reduce the components of the control valve 306. The valve housing 308 also includes all the fluid passageways needed to transport fluid from the control valve 306 to the rotor 38. Accordingly, there is no need to use orifices in the cam nose of the camshaft 102 (FIG. 4) to direct the fluid 120 to the variable cam phaser 11.

The control valve 306 defines at least one inlet port 318 in fluid communication with the fluid source 210 (FIG. 10). In the depicted embodiment, the valve housing 308 of the control valve 306 includes a housing body 309 and defines a plurality of inlet ports 318 extending through the housing body 309. Specifically, the inlet ports 318 each extend through at least a portion of the shank 312 and traverse the longitudinal axis 18. Accordingly, the fluid source 210 can supply the fluid 120 (e.g., oil) to the control valve 306 via the inlet ports 318.

Aside from the inlet ports 318, the housing body 309 is substantially cylindrical and defines an inner housing cavity 322 extending along the longitudinal axis 18. The inner housing cavity 322 is in fluid communication with the inlet ports 318. The valve housing 308 further defines a first group of outlet ports, which are referred to as the first outlet ports 346, and a second group of outlet ports, which are referred to as the second outlet ports 360. It is contemplated that the valve housing 308 may include only one first outlet port 346 and only one second outlet port 360. Regardless of the quantity, each of the first outlet ports 346 and the second outlet ports 360 extends through the housing body 309 and is in fluid communication with the inner housing cavity 322. The valve housing 308 further includes supply passageways 361 extending through the housing body 309. The supply passageways 361 are completely contained within the valve body 309 in order to minimize the number of components needed to transport the fluid 120 from the control valve 306 to the rotor 38. The supply passageways 361 are in fluid communication with the inlet ports 318. The valve housing 308 is integrally formed so as to define a one-piece structure in order to minimize the number of components needed to transport the fluid 120 from the control valve 306 to the rotor 38.

The control valve 306 further includes a filter assembly 324 for filtering the fluid 120 (e.g., oil) before it enters through the inlet ports 318. Accordingly, the filter assembly 324 is disposed around shank 312 of the valve housing 308 adjacent the inlet ports 318. Due to the position of the filter assembly 324 relative to the inlet ports 318, during operation, the fluid 120 passes through the filter assembly 324 before it enters through the inlet ports 318. As a consequence, the fluid 120 entering the control valve 306 through the inlet ports 318 is filtered before exiting the control valve 306.

The control valve 306 also includes a check ball seat 328 integrally formed with the valve housing body 309. As such, the check ball seat 328 is part of the valve housing body 309. The check ball seat 328 includes defines a seat opening 329 in fluid communication with the inlet ports 318. The control valve 306 additionally includes a check ball 336 configured, shaped, and sized to be disposed on the check ball seat 328. In particular, the check ball 336 is configured to completely block the seat opening 329, thereby precluding fluid flow through the seat opening 329. The control valve 306 also includes a check ball spring 338 coupled to the check ball 336. As such, the check ball spring 338 biases the check ball 336 toward the seat opening 329 in the direction indicated by arrow A2. Accordingly, the check ball 336, the check ball spring 338, and the check ball seat 328 jointly serve as a check valve (i.e., a one-way valve) configured to allow fluid flow from the inlet ports 318 into the inner valve housing cavity 322 through the seat opening 329 but precludes fluid flow from the inner housing cavity 322 to the inlet ports 318 through the seat opening 329.

Figure 11:
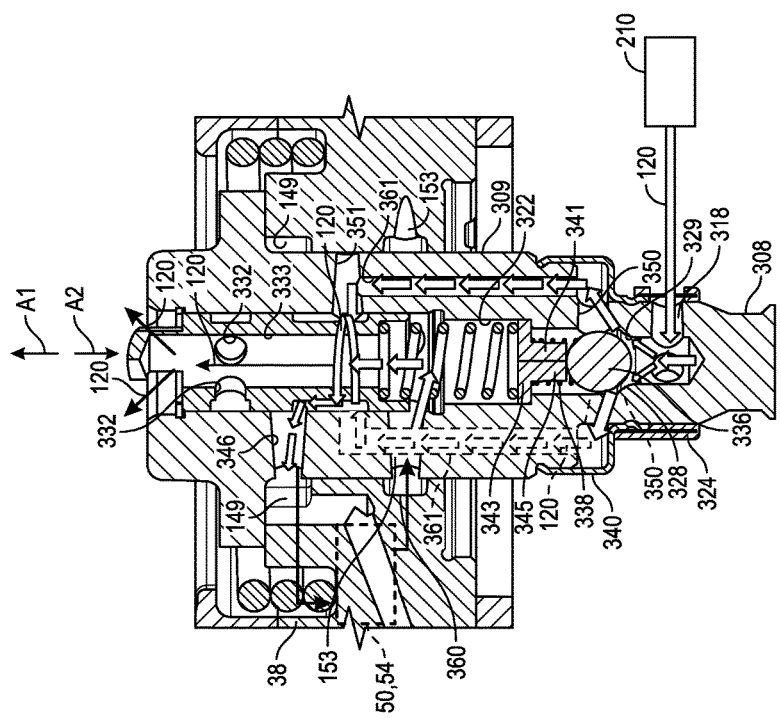
FIG. 11 is a schematic, front cross-sectional view of the control valve shown in FIG. 9, showing the spool in a first spool position.

In operation, when the fluid 120 (e.g., oil) flows from the inlet ports 318 toward the inner housing cavity 322, the fluid 120 exerts sufficient pressure on the check ball 336 against the bias of the check ball spring 338 to cause the check ball 336 to move in the direction indicated by arrow A1 from a first ball position (FIG. 9) to a second ball position (FIG. 11). In the second ball position (FIG. 11), the check ball 336 does not block the seat opening 329, thereby allowing fluid flow from the inlet ports 318 toward the inner housing cavity 322 through the seat opening 329. When the fluid 120 does not exert pressure on the check ball 336 or when fluid 120 tries to flow from the inner housing cavity 322 towards the inlet ports 318, the check ball spring 338 biases the check ball 136 towards the direction indicated by arrow A2 until the check ball 336 reaches the first ball position (FIG. 9). In the first ball position, the check ball 336 completely blocks the seat opening 329, precluding fluid flow from the inner housing cavity 322 to the inlet ports 318 through the seat opening 329.

The valve housing 308 further defines supply orifices 350 fluidly interconnecting the inlet ports 318 and the supply passageways 361. The supply orifices extend through the housing body 309. The control valve 306 further includes a flow diverter enclosure 340 disposed around the housing body 309 to prevent the fluid 120 from exiting the control valve 306 through the supply orifices 350. Accordingly, the flow diverter enclosure 340 surrounds the valve housing 308, such that the flow diverter enclosure 340 directly covers the supply orifices 350. Alternatively, plug balls be inserted into the supply orifices 350 to prevent the fluid 120 from exiting the control valve 306 through the supply orifices 350. In addition to the supply orifices 350, the valve housing 308 defines a plurality of connection passages 351 each in direct fluid communication with a respective supply passageway 361. The connection passageways 351 extend through the valve body 309 and allow the fluid 120 to flow from the control valve 106 to the rotor 38.

The control valve 306 further includes a spring retainer 341 disposed inside the inner housing cavity 322. The check ball spring 338 is coupled to the spring retainer 341, allowing the check ball 336 to bias the check ball 336 toward the inlet port 318. The spring retainer 341 includes disk 343 and a retainer protrusion 345 extending from the disk 343. The check ball spring 338 surrounds the retainer protrusion 345 and is in contact with the check ball 336.

The control valve 406 further includes a spool spring 364 and a spool 326 coupled to the spool spring 364. The spool spring 364 is disposed inside inner housing cavity 322 and may be directly coupled to the disk 343 of the spring retainer 341. For example, the spool spring 364 may rest on the disk 343 of the spring retainer 341. The spool spring 364 is also coupled to the spool 326 in order to bias the spool 126 in the direction indicated by arrow A1 away from the inlet ports 318. The control valve 306 also includes a retainer clip 455 coupled to the valve housing 308 to retain the spool 426 inside the valve housing 308.

Figure 12:
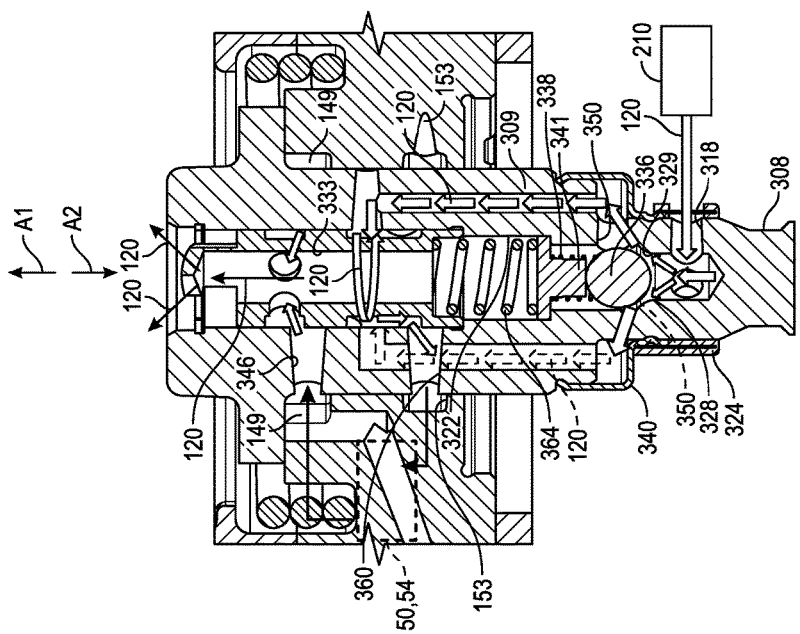
FIG. 12 is a schematic, front cross-sectional view of the control valve shown in FIG. 9, showing the spool in a second spool position.

The spool 326 is movably disposed in the valve housing 308 and may be substantially cylindrical in order to fit within the housing body 309. As such, the spool 326 can move within the valve housing 308 along the longitudinal axis 18 between a first spool position (FIG. 11) and a second spool position (FIG. 12). Therefore, the spool 326 can move inside the valve housing 308 in the direction indicated by arrows A1 and A2. In the depicted embodiment, the spool 326 includes a spool body 330 and defines a plurality of spool vents 432 extending through the spool body 330. The spool vents 332 allow the fluid 120 to exit the control valve 306. The spool 326 defines an inner spool cavity 333 extending through the spool body 330 along the longitudinal axis 18. The inner spool cavity 333 is in fluid communication with the spool vents 332 to allow gases to exit the control valve 306.

As discussed above, the rotor 38 defines one or more first rotor passageways 149 and one or more second rotor passageways 153. The first rotor passageway 149 extends through the rotor 38 and can fluidly couple the first chamber 50 (FIG. 3) to the supply channels 361 or the spool vents 332 depending on the position of the spool 326 relative to the valve housing 108. When the spool 326 is in the first spool position (FIG. 11) relative to the valve housing 308, the first rotor passageway 149 fluidly couples the inlet ports 318 with the first chamber 50 via the supply passageways 361, the spool 326 precludes fluid flow between the inlet ports 318 and the second rotor passageway 153, and the second rotor passageway 153 is in fluid communication with the spool vents 332. On the other hand, when the spool 326 is in the second spool position relative to the valve housing 308 (FIG. 12), the second rotor passageway 153 is in fluid communication with the inlet ports 318 via the supply channels 361, the spool 326 precludes fluid flow between the inlet ports 318 and the first rotor passageway 149, and the first rotor passageway 149 is in fluid communication with the spool vents 332.

With reference to FIG. 11, when the spool 326 is in the first spool position, the control valve 306 is in the default position. When the control valve 306 is in the default position (i.e., the zero stroke position), the rotor 38 of the variable cam phaser 10 is in the fully retarded position in the case of an intake application, and in the fully advanced position in the case of an exhaust application. As discussed above, the spool spring 364 biases the spool 326 to the first spool position and, therefore, the rotor 38 is designed to mechanically default to its fully retarded position or advanced position depending on the application described above.

With continued reference to FIG. 11, when the spool 326 is in the first spool position, the fluid 120 can flow from the fluid source 210, such as an oil supply from a cam bearing journal, to the inlet ports 318. Before entering the inlet ports 318, the fluid 120 passes through the filter assembly 324, where it is filtered to maximize the life of the control valve 306. After flowing into the inlet ports 318, the fluid 120 flows through the seat opening 329. As the fluid 120 enters the seat opening 329, the pressure exerted by the fluid 120 on the check ball 336 causes the check ball 336 to move, against the influence of the check ball spring 338, from the first ball position (FIG. 9) to the second ball position (FIG. 11), thereby allowing the fluid 120 to enter the supply orifices 350. Then, the fluid 120 flows from the supply orifices 350 to the supply channels 361. Next, the fluid 120 flows from the supply channels 361 into the inner housing cavity 322 through some connection passages 351.

With continued reference to FIG. 11, once in the inner housing cavity 322, the fluid 120 flows around (and outside) the spool 326 until it exits the control valve 306 through the first outlet ports 346 of the valve housing 308. Because of the position of the spool 326 relative to the valve housing 308, the fluid 120 can flow from the first outlet ports 346 of the valve housing 308 to the first rotor passageway 149 of the rotor 38 until the fluid 120 reaches the first chamber 50 of the rotor 38. As a consequence, the rotor 38 rotates relative to the stator 22 about the longitudinal axis 18 in the first rotational direction R1. When disposed in the first spool position, the spool 326 precludes the fluid 120 from flowing from the inlet ports 318 to the second outlet ports 360 of the valve housing 308. Instead, the fluid 120 can flow from the second chamber 54 of the rotor 38 into the inner spool 333 through the second outlet ports 360. Once the fluid 120 is in the inner housing cavity 322, the fluid 120 can exit the control valve 106 through the spool vents 332.

With reference to FIG. 12, as discussed above, the actuation assembly 208 can move the spool 126 from the first spool position (FIG. 11) to the second spool position (FIG. 12) against the bias of the spool spring 364. When the spool 126 is in the second spool position (i.e., the full stroke position), the rotor 38 of the variable cam phaser 11 is in the fully advanced position in the case of an intake application, and in the fully retarded position in the case of an exhaust application. When the spool 326 is in the second spool position, the fluid 120 can flow from the fluid source 210, such as an oil supply from a cam bearing journal, to the inlet ports 318. Before entering the inlet ports 318, the fluid 120 passes through the filter assembly 324, where it is filtered to maximize the life of the control valve 306. After flowing into the inlet ports 318, the fluid 120 flows through the seat opening 329. As the fluid 120 enters the seat opening 329, the pressure exerted by the fluid 120 on the check ball 336 causes the check ball 336 to move, against the influence of the check ball spring 338, from the first ball position (FIG. 9) to the second ball position (FIG. 11), thereby allowing the fluid 120 to enter the supply orifices 350. Then, the fluid 120 flows from the supply orifices 350 to the supply channels 361. Next, the fluid 120 flows from the supply channels 161 to the inner housing cavity 322.

With continued reference to FIG. 12, once in the inner housing cavity 322, the fluid 120 flows around (and outside) the spool 326 until it exits the control valve 306 through the second outlet ports 360 of the valve housing 308. Because of the position of the spool 326 relative to the valve housing 308, the fluid 120 can flow from the second outlet ports 360 of the valve housing 308 to the second rotor passageway 153 of the rotor 38 until the fluid 120 reaches the second chamber 54 of the rotor 38. As a consequence, the rotor 38 rotates relative to the stator 22 about the longitudinal axis 18 in the second rotational direction R2. When disposed in the second spool position, the spool 326 precludes the fluid 120 from flowing from the inlet ports 318 to the first outlet ports 346 of the valve housing 308. Instead, the fluid 120 can flow from the first chamber 50 of the rotor 38 into the inner spool cavity 333 of the spool 326 through the first outlet ports 346. Once the fluid 120 is in the inner spool cavity 333 of the spool 326, the fluid 120 can exit the control valve 306 through the spool vents 332.

Figure 13:
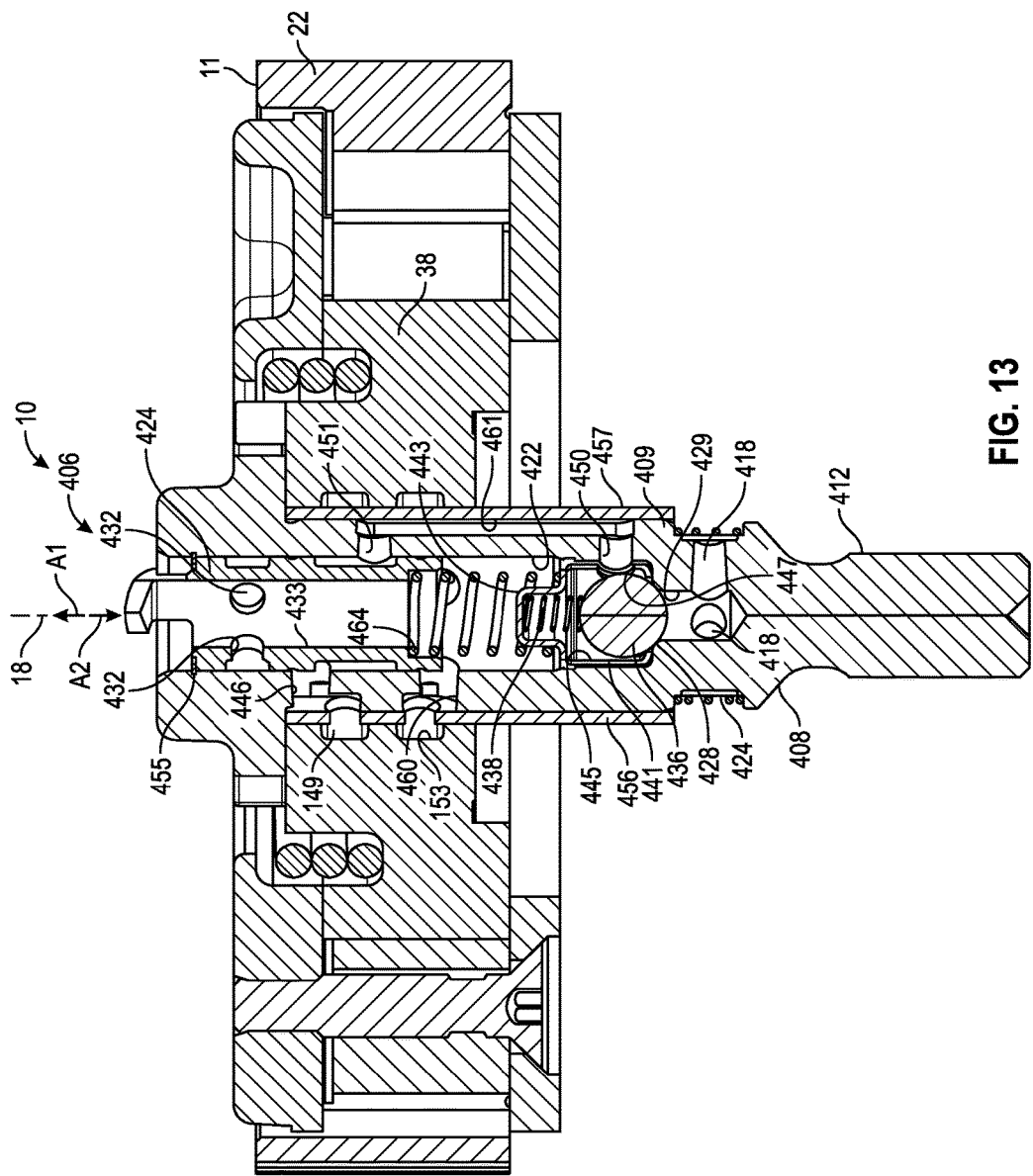
FIG. 13 is a schematic, cross-sectional view of the variable cam phaser assembly including a control valve in accordance with an alternate embodiment of the present disclosure.
Figure 14:
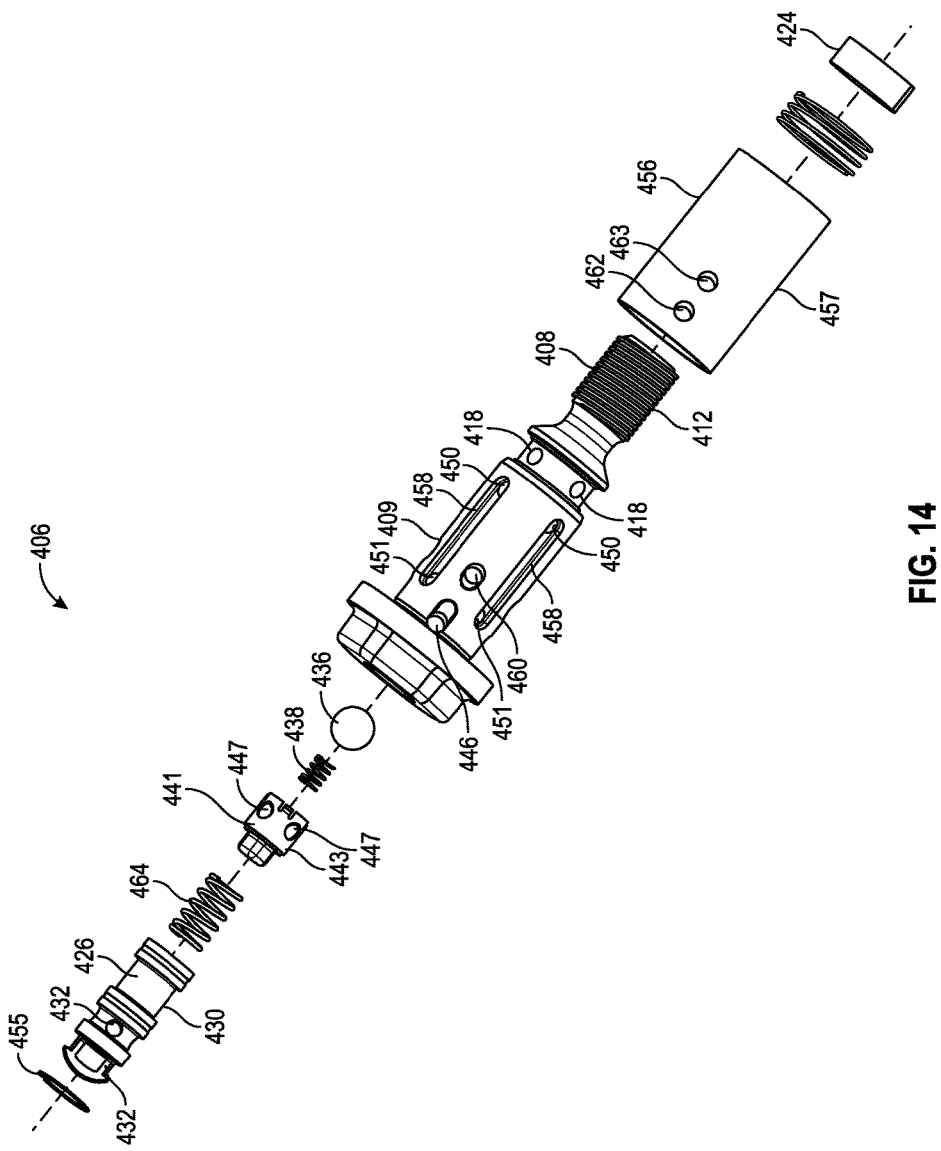
FIG. 14 is a schematic, perspective exploded view of the control valve shown in FIG. 13.

With reference to FIGS. 13 and 14, the variable cam phaser assembly 10 includes an alternate embodiment of the control valve 406. The structure and operation of the control valve 406 is similar to the structure and operation of the control valve 106 described above. Therefore, the differences between the control valve 406 and the control valve 106 are highlighted below.

The control valve 406 is also part of the engine assembly 200 and defines at least one inlet port 418 in fluid communication with the fluid source 210. The control valve 406 includes a valve housing 408. In the depicted embodiment, the valve housing 408 of the control valve 406 includes a housing body 409 and defines a plurality of inlet ports 418 extending through the housing body 409. Specifically, the inlet ports 418 each extend through at least a portion of the shank 412 and traverse the longitudinal axis 18. Accordingly, the fluid source 210 (FIG. 15) can supply the fluid 120 (e.g., oil) to the control valve 406 via the inlet ports 418.

Aside from the inlet ports 418, the housing body 409 defines an inner housing cavity 422 extending along the longitudinal axis 18. The inner housing cavity 122 is in fluid communication with the inlet ports 418. The valve housing 408 further defines a first group of outlet ports, which are referred to as the first outlet ports 446, and a second group of outlet ports, which are referred to as the second outlet ports 460. It is contemplated that the valve housing 408 may include only one first outlet port 446 and only one second outlet port 460. Regardless of the quantity, each of the first outlet ports 446 and the second outlet ports 460 extends through the housing body 409 and is in fluid communication with the inner housing cavity 422. The valve housing 408 includes defines a plurality of open channels 458 extending into the housing body 409. The open channels 458 are circumferentially spaced apart from each other. The valve housing 408 further defines a plurality of supply orifices 450 in fluid communication with the open channels 458. Specifically, each supply orifice 450 is in direct fluid communication with a respective open channel 458. The valve housing 408 further defines a plurality of connection passages 451 each in direct fluid communication with a respective open channel 458. The connection passageways 451 extend through the housing body 409 and allow the fluid 120 to flow from the control valve 406 to the rotor 38.

The control valve 406 further includes a filter 424 for filtering the fluid 120 (e.g., oil) before the fluid 120 flows into the inlet ports 418. Accordingly, the filter 424 is disposed around the valve housing 408 adjacent the inlet ports 418. Due to the position of the filter 424 relative to the inlet ports 418, during operation, the fluid 120 passes through the filter 424 before it flows into the inlet ports 418 and. As a consequence, the fluid 120 entering the control valve 406 through the inlet ports 418 is filtered before entering the control valve 406.

The control valve 406 also includes a check ball seat 428 integrally formed with the valve housing body 409. As such, the check ball seat 428 is part of the housing body 409. The check ball seat 428 includes defines a seat opening 429 in fluid communication with the inlet ports 418. The control valve 406 additionally includes a check ball 436 configured, shaped, and sized to be disposed on the check ball seat 428. In particular, the check ball 436 is configured to completely block the seat opening 429, thereby precluding fluid flow through the seat opening 429. The control valve 406 also includes a check ball spring 438 coupled to the check ball 436. As such, the check ball spring 438 biases the check ball 436 toward the seat opening 429 in the direction indicated by arrow A2. Accordingly, the check ball 436, the check ball spring 438, and the check ball seat 428 jointly serve as a check valve (i.e., a one-way valve).

Figure 15:
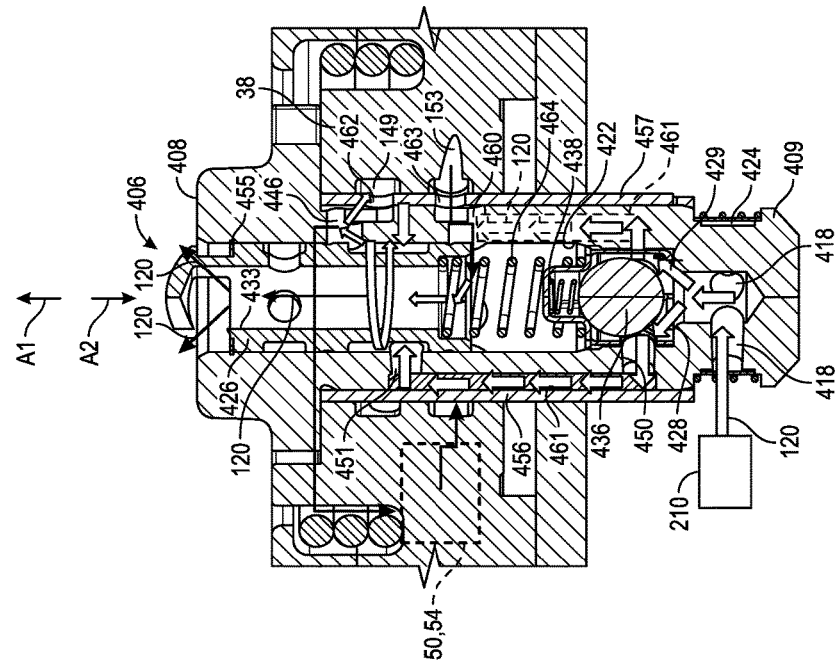
FIG. 15 is a schematic, front cross-sectional view of the control valve shown in FIG. 13, showing the spool in a first spool position.

In operation, when the fluid 120 (e.g., oil) flows from the inlet ports 418, the fluid 120 exerts sufficient pressure on the check ball 436 against the bias of the check ball spring 438 to cause the check ball 436 to move in the direction indicated by arrow A1 from a first ball position (FIG. 13) to a second ball position (FIG. 15). In the second ball position (FIG. 15), the check ball 436 does not block the seat opening 429, thereby allowing fluid flow from the inlet ports 418 the inner housing cavity 422 through the seat opening 429. When the fluid 120 does not exert pressure on the check ball 436 or when fluid 120 tries to flow from the inner housing cavity 422 toward the inlet ports 418, the check ball spring 438 biases the check ball 436 toward in the direction indicated by arrow A2 until the check ball 436 reaches the first ball position (FIG. 13). In the first ball position, the check ball 436 completely blocks the seat opening 429, precluding fluid flow from the inner housing cavity 422 to the inlet ports 418 through the seat opening 429.

The control valve 406 includes a flow delivery enclosure 456, which may be configured as a sleeve. The flow delivery enclosure 456 is pressed fitted onto the valve housing 408. The flow delivery enclosure 456 includes an enclosure body 457. The flow delivery enclosure 456 is disposed around the valve housing 408. Therefore, the flow delivery enclosure 456 surrounds the valve housing 408. As a result, the open channels 458 are covered by the flow delivery enclosure 456. Therefore, the flow delivery enclosure 456 and the valve housing 408 jointly form supply channels 461, which are partly formed by the open channels 456 of the flow delivery enclosure 456. The flow delivery enclosure 456 seals and isolates the supply channels 461 from each other. Each supply channel 461 is in fluid communication with a respective supply orifice 456. Accordingly, the fluid 120 can flow between inlet ports 418 to the supply channels 161 via the supply orifices 456. The flow delivery enclosure 456 also includes first enclosure control ports 462 and second enclosure control ports 463 each extending through the enclosure body 457. Each of the first enclosure control ports 462 is substantially aligned with a respective first outlet port 446 to allow fluid flow therebetween. Each of the second enclosure control ports 463 is substantially aligned with a respective second outlet port 460 to allow fluid flow therebetween.

The control valve 406 further includes a check valve cartridge 441 disposed inside the inner housing cavity 422. The check valve cartridge 441 includes a cartridge body 443 and defines an inner cartridge cavity 445 inside the cartridge body 443. The check ball spring 438 is entirely disposed inside the inner cartridge cavity 445 to minimize the space occupied by the control valve 406, and the check ball 436 is at least partly disposed inside the inner cartridge cavity 445. The check valve cartridge 441 further defines a plurality of cartridge orifices 447 extending through the cartridge body 443 and in fluid communication with the inner cartridge cavity 445. The cartridge orifices 447 are each substantially aligned with a respective supply orifice 450 to allow fluid flow therebetween.

The control valve 406 further includes a spool spring 464 and a spool 426 coupled to the spool spring 464. The spool spring 464 is disposed inside the inner housing cavity 422 and may be directly coupled to the check valve cartridge 441. The spool spring 464 is also coupled to the spool 426 in order to bias the spool 426 in the direction indicated by arrow A1 away from the inlet ports 418. The control valve 406 also includes a retainer clip 455 coupled to the valve housing 408 to retain the spool 426 inside the valve housing 408. The retainer clip 455 is dispose inside the inner housing cavity 422.

Figure 16:
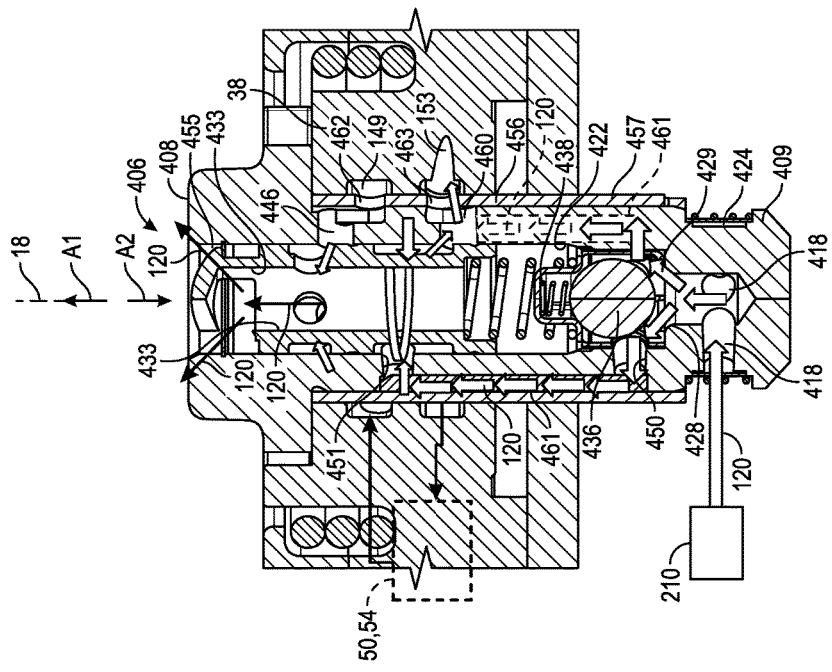
FIG. 16 is a schematic, front cross-sectional view of the control valve shown in FIG. 13, showing the spool in a second spool position.

The spool 426 is movably disposed in the inner housing cavity 422 and may be substantially cylindrical in order to fit within the valve housing 408. As such, the spool 426 can move within the valve housing 408 along the longitudinal axis 18 between a first spool position (FIG. 15) and a second spool position (FIG. 16). Therefore, the spool 426 can move inside the valve housing 408 in the direction indicated by arrows A1 and A2. In the depicted embodiment, the spool 426 includes a spool body 430 and defines a plurality of spool vents 432 extending through the spool body 430. The spool vents 432 allow the fluid 120 to exit the control valve 406. The spool 426 defines an inner spool cavity 433 extending through the spool body 430 along the longitudinal axis 18. The inner spool cavity 433 is in fluid communication with the spool vents 432 to allow fluid to exit the control valve 406.

As discussed above, the rotor 38 defines one or more first rotor passageways 149 and one or more second rotor passageways 153. The first rotor passageway 149 extends through the rotor 38 and can fluidly couple the first chamber 50 (FIG. 3) to the supply channels 461 or the spool vents 432 depending on the position of the spool 426 relative to the valve housing 408. When the spool 426 is in the first spool position (FIG. 15) relative to the valve housing 408, the first rotor passageway 149 fluidly couples the inlet ports 418 with the first chamber 50 via the supply channels 461, the spool 426 precludes fluid flow between the inlet ports 418 and the second rotor passageway 153, and the second rotor passageway 153 is in fluid communication with the spool vents 432. On the other hand, when the spool 426 is in the second spool position relative to the valve housing 108 (FIG. 16), the second rotor passageway 153 is in fluid communication with the inlet ports 418 via the supply channels 461, the spool 426 precludes fluid flow between the inlet ports 418 and the first rotor passageway 149, and the first rotor passageway 149 is in fluid communication with the spool vents 432.

With reference to FIG. 15, when the spool 426 is in the first spool position, the control valve 406 is in the default position. When the control valve 406 is in the default position (i.e., the zero stroke position), the rotor 38 of the variable cam phaser 10 is in the fully retarded position in the case of an intake application, and in the fully advanced position in the case of an exhaust application. As discussed above, the spool spring 464 biases the spool 426 to the first spool position and, therefore, the rotor 38 is designed to mechanically default to its fully retarded position or advanced position depending on the application described above.

With continued reference to FIG. 15, when the spool 426 is in the first spool position, the fluid 120 can flow from the fluid source 210, such as an oil supply from a cam bearing journal, to the inlet ports 418. Before flowing into the inlet ports 418, the fluid 120 passes through the filter 424, where it is filtered to maximize the life of the control valve 406. Then, the fluid 120 flows through the seat opening 429. As the fluid 120 enters the seat opening 429, the pressure exerted by the fluid 120 on the check ball 436 causes the check ball 436 to move, against the influence of the check ball spring 438, from the first ball position (FIG. 13) to the second ball position (FIG. 15), thereby allowing the fluid 120 to enter the supply orifices 450 through the cartridge orifices 447. Then, the fluid 120 flows from the supply orifices 450 to the supply channels 461 through the supply orifices 450. Next, the fluid 120 flows from the supply channels 461 to the inner housing cavity 422 through the connection passageways 451.

With continued reference to FIG. 15, once in the inner housing cavity 422, the fluid 120 flows around (and outside) the spool 426 until it exits the control valve 406 through the first outlet ports 446 and the first enclosure control ports 462. Because of the position of the spool 426 relative to the valve housing 408, the fluid 120 can flow from the first outlet ports 446 of the valve housing 408 to the first rotor passageway 149 of the rotor 38 until the fluid 120 reaches the first chamber 50 of the rotor 38. As a consequence, the rotor 38 rotates relative to the stator 22 about the longitudinal axis 18 in the first rotational direction R1. When disposed in the first spool position, the spool 426 precludes the fluid 120 from flowing from the inlet ports 418 to the second outlet ports 460 of the valve housing 408. Instead, the fluid 120 can flow from the second chamber 54 of the rotor 38 into the inner spool cavity 433 of the spool 126 through the second outlet ports 460 and the second enclosure control ports 463. Once the fluid 120 is in the inner spool cavity 433 of the spool 426, the fluid 120 can exit the control valve 106 through the spool vents 432.

With reference to FIG. 16, as discussed above, the actuation assembly 208 can move the spool 426 from the first spool position (FIG. 15) to the second spool position (FIG. 16) against the bias of the spool spring 464. When the spool 426 is in the second spool position (i.e., the full stroke position), the rotor 38 of the variable cam phaser 11 is in the fully advanced position in the case of an intake application, and in the fully retarded position in the case of an exhaust application. When the spool 426 is in the second spool position, the fluid 120 can flow from the fluid source 210, such as an oil supply from a cam bearing journal, to the inlet ports 418. Before flowing into the inlet ports 418, the fluid 120 passes through the filter 424, where it is filtered to maximize the life of the control valve 106. Then, the fluid 120 flows from the inlet ports 418 to the seat opening 129. As the fluid 120 enters the seat opening 429, the pressure exerted by the fluid 120 on the check ball 436 causes the check ball 436 to move, against the influence of the check ball spring 438, from the first ball position (FIG. 13) to the second ball position (FIG. 16), thereby allowing the fluid 120 to enter the supply orifices 450 through the cartridge orifices 447. Then, the fluid 120 flows from the supply orifices 450 to the supply channels 461 through the supply orifices 450. Next, the fluid 120 flows from the supply channels 461 to the inner housing cavity 422 through the connection passageways 451.

With continued reference to FIG. 16, once in the inner housing cavity 422, the fluid 120 flows around (and outside) the spool 426 until it exits the control valve 406 through the second outlet ports 460 and the second enclosure control ports 463. Because of the position of the spool 426 relative to the valve housing 408, the fluid 120 can flow from the second outlet ports 460 of the valve housing 408 to the second rotor passageway 153 of the rotor 38 until the fluid 120 reaches the second chamber 54 of the rotor 38. As a consequence, the rotor 38 rotates relative to the stator 22 about the longitudinal axis 18 in the second rotational direction R2. When disposed in the second spool position, the spool 426 precludes the fluid 120 from flowing from the inlet ports 418 to the first outlet ports 446 of the valve housing 408. Instead, the fluid 120 can flow from the first chamber 50 of the rotor 38 into the inner spool cavity 433 of the spool 426 through the first outlet ports 446 and the first enclosure control ports 462. Once the fluid 120 is in the inner spool cavity 433 of the spool 126, the fluid 120 can exit the control valve 406 through the spool vents 432.

Figure 17:
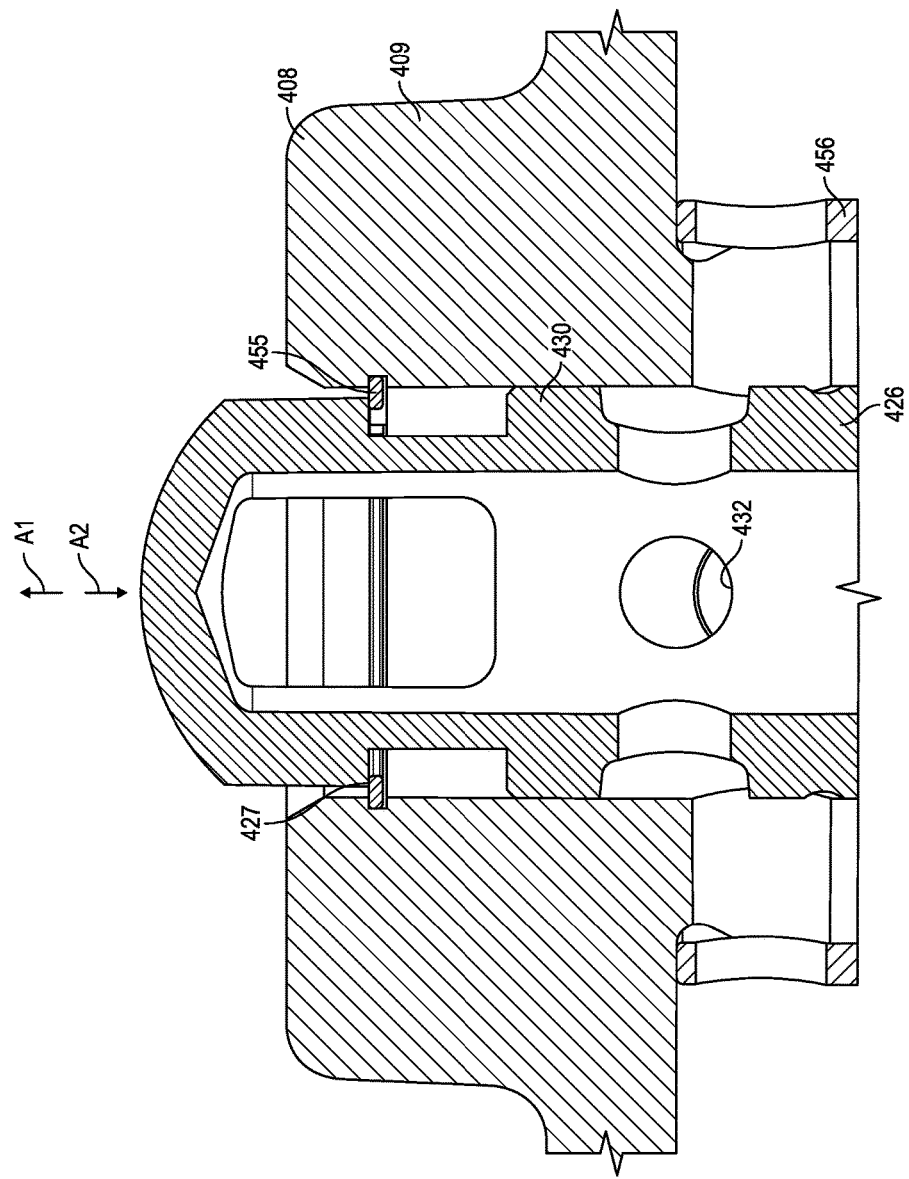
FIG. 17 is a schematic, enlarged, cross-sectional, fragmentary view of the control valve shown in FIG. 13, showing the spool in a second spool position.

With reference to FIG. 17, the spool 426 includes a mechanical stop 427 configured to directly contact and abut the retainer clip 455 in order to limit the movement of the spool 426 in the direction indicated by arrow A2. Thus, the mechanical stop 427 is in direct contact with the retainer clip 455 when the spool 426 is in the second spool position in order to limit further movement of the spool 426 toward the inlet port 418. As such, the spool 426 can be moved to the appropriate position, thereby enhance the operation of the control valve 406.

While the best modes for carrying out the teachings have been described in detail, those familiar with the art to which this disclosure relates will recognize various alternative designs and embodiments for practicing the teachings within the scope of the appended claims. The control valves illustratively disclosed herein may be suitably practiced in the absence of any element which is not specifically disclosed herein. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Although the presently disclosed control valves can be used in connection with a cam phaser, it is contemplated that the presently disclosed control valves can be to control fluid flow to other machines or structures.

The invention claimed is:

1. A camshaft system, comprising:
 a stator defining a stator inner cavity;
 a rotor disposed within the stator inner cavity, wherein the rotor and the stator collectively define a first chamber and a second chamber;
 a control valve including:
  a valve housing extending along a longitudinal axis, wherein the valve housing defines an inlet port, a first outlet port, and a second outlet port;
  a spool guide disposed inside the valve housing;
  a flow guide belt disposed around the spool guide, wherein the flow guide belt is disposed inside the valve housing;
  a spool movably disposed in the spool guide, wherein the spool is movable relative to the valve housing along the longitudinal axis between a first spool position and a second spool position, wherein the valve housing, the flow guide belt, and the spool guide cooperate to form fluid conduits;
 wherein the first outlet port is in fluid communication with the inlet port when spool is disposed in the first spool position to allow fluid flow from the inlet port to the first chamber through the first outlet port, causing the rotor to rotate relative to the stator about the longitudinal axis in a first rotational direction;
 wherein the spool precludes fluid flow from the inlet port to the second outlet port when the spool is disposed in the first spool position;
 wherein the second outlet port is in fluid communication with the inlet port when the spool is in the second spool position to allow fluid flow from the inlet port to the second chamber through the second outlet port, causing the rotor to rotate relative to the stator about the longitudinal axis in a second rotational direction, and the second rotational direction is opposite to the first rotational direction;
 wherein the spool precludes fluid flow from the inlet port to the first outlet port when the spool is in the second spool position; and
 a camshaft directly coupled to the valve housing, wherein the camshaft includes inner threads, the valve housing is configured as a bolt, the bolt has a head and a shank coupled to the head, the shank includes external threads, and the external threads of the shank mate with the inner threads of the camshaft to couple the valve housing to the camshaft.

2. The camshaft system of claim 1, wherein the flow guide belt is coupled to the spool guide such that the flow guide belt remains stationary relative to the spool guide.

3. The camshaft system of claim 1, wherein the flow guide belt includes a belt body and defines a plurality of belt control ports extending through the belt body, the spool guide includes a guide body and defines a plurality of guide control ports extending through the guide body, and each of the belt control ports is aligned with one of the guide control ports to allow fluid flow between the guide control ports and the belt control ports.

4. The camshaft system of claim 1, wherein the flow guide belt and the valve housing jointly defines a plurality of supply channels.

5. The camshaft system of claim 1, further comprising a check ball, wherein the spool guide includes a guide body and defines a first inner guide cavity inside the guide body and a second inner guide cavity inside the guide body, and the spool is partly disposed inside the first inner guide cavity, and the check ball is at least partly disposed in the second inner guide cavity.

6. The camshaft system of claim 5, further comprising a spool spring, wherein the spool spring is disposed inside the first inner guide cavity and is coupled to the spool guide and the spool to bias the spool away from the inlet port.

7. The camshaft system of claim 6, further comprising a check ball spring disposed inside the second inner guide cavity, wherein the check ball spring is coupled to the spool guide and the check ball to bias the check ball toward the inlet port.

8. The camshaft system of claim 1, wherein the flow guide belt and the spool guide are discrete components that are coupled to each other.

9. A camshaft system, comprising:
 a stator defining a stator inner cavity;
 a rotor disposed within the stator inner cavity, wherein the rotor and the stator collectively define a first chamber and a second chamber;
 a control valve including:
  a valve housing extending along a longitudinal axis, wherein the valve housing includes a housing body and defines an inner housing cavity, an inlet port, a first outlet port in communication with the inner housing cavity, a second outlet port in communication with the inner housing cavity, and a plurality of supply passageways extending through housing body, and each of the supply passageways fluidly is fluid communication with the inlet port;
  a spool movably disposed in the valve housing, wherein the spool is movable relative to the valve housing along the longitudinal axis between a first spool position and a second spool position;
 wherein the first outlet port is in fluid communication with the inlet port when spool is disposed in the first spool position to allow fluid flow from the inlet port to the first chamber through the first outlet port, causing the rotor to rotate relative to the stator about the longitudinal axis in a first rotational direction;

wherein the spool precludes fluid flow from the inlet port to the second outlet port when the spool is disposed in the first spool position;

wherein the second outlet port is in fluid communication with the inlet port when the spool is in the second spool position to allow fluid flow from the inlet port to the second chamber through the second outlet port, causing the rotor to rotate relative to the stator about the longitudinal axis in a second rotational direction, and the second rotational direction is opposite to the first rotational direction; and wherein the spool precludes fluid flow from the inlet port to the first outlet port when the spool is in the second spool position; and a camshaft directly coupled to the valve housing, wherein the camshaft includes inner threads, the valve housing is configured as a bolt, the bolt has a head and a shank coupled to the head, the shank includes external threads, and the external threads of the shank mate with the inner threads of the camshaft to couple the valve housing to the camshaft.

10. The camshaft system of claim 9, wherein the valve housing is integrally formed such as to define a one-piece structure.

11. The camshaft system of claim 9, further comprising a spool spring and a spring retainer, wherein the spool spring rests on the spring retainer, the spool spring is disposed inside the inner housing cavity, and the spool spring is coupled to the spool to bias the spool away from the inlet port.

12. The camshaft system of claim 11, further comprising a check ball spring disposed inside the inner housing cavity, wherein the check ball spring is coupled to the spring retainer and the check ball to bias the check ball toward the inlet port.

13. The camshaft system of claim 12, further comprising a check ball movably disposed inside the valve housing to prevent fluid flow from supply passageways to the inlet port.

14. A camshaft system, comprising:
a stator defining a stator inner cavity;
a rotor disposed within the stator inner cavity, wherein the rotor and the stator collectively define a first chamber and a second chamber;
a control valve including:
a valve housing extending along a longitudinal axis, wherein the valve housing includes a housing body and defines an inner housing cavity, an inlet port, a first outlet port in communication with the inner housing cavity, and a second outlet port in communication with the inner housing cavity;
a flow delivery enclosure disposed around the valve housing, wherein the flow delivery enclosure and the valve housing collectively define a plurality of supply channels between the flow delivery enclosure and the valve housing, and each of the supply channels fluidly couples the inlet port and the inner housing cavity;
a spool movably disposed inside the inner housing cavity, wherein the spool is movable relative to the valve housing along the longitudinal axis between a first spool position and a second spool position;
wherein the first outlet port is in fluid communication with the inlet port when spool is disposed in the first spool position;

wherein the spool precludes fluid flow from the inlet port to the second outlet port when the spool is disposed in the first spool position to allow fluid flow from the inlet port to the first chamber through the first outlet port, causing the rotor to rotate relative to the stator about the longitudinal axis in a first rotational direction;

wherein the second outlet port is in fluid communication with the inlet port when the spool is in the second spool position to allow fluid flow from the inlet port to the second chamber through the second outlet port, causing the rotor to rotate relative to the stator about the longitudinal axis in a second rotational direction, and the second rotational direction is opposite to the first rotational direction;

wherein the spool precludes fluid flow from the inlet port to the first outlet port when the spool is in the second spool position; and a camshaft directly coupled to the valve housing, wherein the camshaft includes inner threads, the valve housing is configured as a bolt, the bolt has a head and a shank coupled to the head, the shank includes external threads, and the external threads of the shank mate with the inner threads of the camshaft to couple the valve housing to the camshaft.

15. The camshaft system of claim 14, further comprising a retainer clip coupled to the housing body, wherein the retainer clip is disposed inside the inner housing cavity, the spool includes a spool body and a mechanical stop extending from the spool body, and the mechanical stop is in direct contact with the retainer clip when the spool is in the second spool position in order to limit further movement of the spool toward the inlet port.

16. The camshaft system of claim 14, further comprising a check valve cartridge disposed inside the inner housing cavity, a check ball disposed inside the inner housing cavity, a check ball at least partly disposed inside the check valve cartridge, and a check spring disposed inside the check valve cartridge, wherein the check spring is coupled to the check ball and the check valve cartridge to bias the check ball toward the inlet port.

17. The camshaft system of claim 16, further comprising a spool spring disposed inside the inner housing cavity, wherein the spool spring is coupled to the spool and the check valve cartridge to bias the spool away from the inlet port.

18. The camshaft system of claim 16, wherein the check valve cartridge includes a cartridge body and defines a cartridge orifice extending through the cartridge body, and the cartridge orifice is in fluid communication with the supply channels to allow fluid flow from the inlet port to the supply channels through the cartridge orifice.

19. The camshaft system of claim 14, wherein the flow delivery enclosure includes an enclosure body, the flow delivery enclosure defines a first enclosure control port extending through the enclosure body and a second enclosure control port extending through the enclosure body, the first enclosure control port is in fluid communication with the first outlet port, and the second enclosure control ports is in fluid communication with the second outlet port.

* * * * *